US010754604B2

(12) United States Patent
Lee et al.

(10) Patent No.: US 10,754,604 B2
(45) Date of Patent: Aug. 25, 2020

(54) DISPLAY APPARATUS AND METHOD FOR CONTROLLING SAME

(71) Applicant: LG ELECTRONICS INC., Seoul (KR)

(72) Inventors: Doyoung Lee, Seoul (KR); Sihwa Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 254 days.

(21) Appl. No.: 15/508,086

(22) PCT Filed: Sep. 3, 2014

(86) PCT No.: PCT/KR2014/008260
§ 371 (c)(1),
(2) Date: Mar. 1, 2017

(87) PCT Pub. No.: WO2016/035907
PCT Pub. Date: Mar. 10, 2016

(65) Prior Publication Data
US 2017/0286042 A1 Oct. 5, 2017

(51) Int. Cl.
G06F 3/048 (2013.01)
G06F 3/14 (2006.01)
(Continued)

(52) U.S. Cl.
CPC .......... *G06F 3/1423* (2013.01); *G06F 1/1649* (2013.01); *G06F 3/00* (2013.01);
(Continued)

(58) Field of Classification Search
CPC . G06F 1/16; G06F 1/1649; G06F 3/00; G06F 3/0488; G06F 3/0482; G06F 3/04883; G06F 3/1423; G06F 3/14
See application file for complete search history.

(56) References Cited

U.S. PATENT DOCUMENTS

2002/0090980 A1* 7/2002 Wilcox ................ G06F 1/1601
455/566
2003/0105892 A1 6/2003 Numano et al.
(Continued)

FOREIGN PATENT DOCUMENTS

CN 101359252 2/2009
CN 101533196 9/2009
(Continued)

OTHER PUBLICATIONS

PCT International Application No. PCT/KR2014/008260, Notification of Transmittal of the International Search Report and the Written Opinion of the International Searching Authority, or Declaration dated Apr. 28, 2015, 9 pages.
(Continued)

Primary Examiner — Mahelet Shiberou
(74) Attorney, Agent, or Firm — Lee, Hong, Degerman, Kang & Waimey

(57) ABSTRACT

Disclosed are a display apparatus and a method for controlling same. The display apparatus comprises: a main display unit for displaying a first application group; a sub display unit stored in the display apparatus or exposed therefrom; a sensor unit for sensing whether the display apparatus is rotated; and a control unit, wherein the sub display unit is exposed from the display apparatus to display a second application group, and the control unit controls the main display unit to display a previously configured screen when the sub display is stored, and when the display apparatus is sensed by the sensor unit to have been rotated in the lateral direction within a previously set time by an angle equal to or greater than a previously set angular value, then the control unit can control the main display unit so that the second application group is displayed thereon on a full screen.

16 Claims, 19 Drawing Sheets

(51) Int. Cl.
    *G06F 3/00*           (2006.01)
    *G06F 9/46*           (2006.01)
    *H04M 1/02*          (2006.01)
    *H04M 1/725*        (2006.01)
    *G06F 1/16*           (2006.01)
    *G06F 3/0482*       (2013.01)
    *G06F 3/0488*       (2013.01)
    *G09G 5/373*        (2006.01)
    *G09G 5/38*          (2006.01)

(52) U.S. Cl.
    CPC ........ *G06F 3/0482* (2013.01); *G06F 3/04883* (2013.01); *G06F 3/14* (2013.01); *G06F 9/46* (2013.01); *H04M 1/0268* (2013.01); *H04M 1/72519* (2013.01); *G06F 2203/04804* (2013.01); *G09G 5/373* (2013.01); *G09G 5/38* (2013.01); *H04M 1/0235* (2013.01); *H04M 2250/16* (2013.01)

(56) References Cited

U.S. PATENT DOCUMENTS

| | | | | |
|---|---|---|---|---|
| 2007/0076861 | A1* | 4/2007 | Ju | H04M 1/0247 379/433.01 |
| 2007/0247792 | A1* | 10/2007 | Yang | G06F 1/1649 361/679.27 |
| 2008/0119237 | A1* | 5/2008 | Kim | G06F 3/0481 455/566 |
| 2008/0163082 | A1* | 7/2008 | Rytivaara | G06F 1/1626 715/762 |
| 2008/0259094 | A1* | 10/2008 | Kim | G06F 1/1626 345/651 |
| 2009/0090825 | A1 | 4/2009 | Jung et al. | |
| 2010/0033435 | A1 | 2/2010 | Huitema | |
| 2010/0056223 | A1* | 3/2010 | Choi | G06F 1/1601 455/566 |
| 2010/0079355 | A1 | 4/2010 | Kilpatrick, II et al. | |
| 2010/0167791 | A1* | 7/2010 | Lim | H04M 1/0235 455/566 |
| 2010/0298033 | A1* | 11/2010 | Lee | G06F 1/1616 455/566 |
| 2010/0331052 | A1* | 12/2010 | Watanabe | G06F 1/1624 455/566 |
| 2011/0050975 | A1* | 3/2011 | Chung | G06F 1/1624 348/333.02 |
| 2012/0081267 | A1* | 4/2012 | Sirpal | G06F 1/1616 345/1.1 |
| 2012/0081277 | A1* | 4/2012 | de Paz | G06F 1/1616 345/156 |
| 2012/0262495 | A1* | 10/2012 | Kobayashi | G06F 3/1438 345/672 |
| 2012/0272128 | A1* | 10/2012 | Takaku | G06F 3/1438 715/205 |
| 2013/0217443 | A1* | 8/2013 | Lim | H04M 1/0216 455/566 |
| 2013/0229324 | A1* | 9/2013 | Zhang | G09G 5/00 345/1.3 |
| 2013/0321340 | A1* | 12/2013 | Seo | G06F 1/1641 345/174 |
| 2013/0342483 | A1 | 12/2013 | Seo et al. | |
| 2014/0210740 | A1* | 7/2014 | Lee | G06F 3/0488 345/173 |
| 2015/0153777 | A1* | 6/2015 | Liu | G06F 1/1652 345/173 |
| 2015/0338888 | A1* | 11/2015 | Kim | G06F 1/1677 345/156 |
| 2016/0063297 | A1* | 3/2016 | Lee | G06F 21/32 382/124 |
| 2016/0154434 | A1* | 6/2016 | Lakhani | G06F 1/1628 361/679.27 |

FOREIGN PATENT DOCUMENTS

| | | |
|---|---|---|
| CN | 103620967 | 3/2014 |
| KR | 1020070087744 | 8/2007 |
| KR | 1020100011261 | 2/2010 |
| KR | 1020140017391 | 2/2014 |

OTHER PUBLICATIONS

European Patent Office Application Serial No. 14901088.6, Search Report dated Feb. 7, 2018, 8 pages.
The State Intellectual Property Office of the People's Republic of China Application Serial No. 201480082507.4, Office Action dated May 17, 2019, 6 pages.
European Patent Office Application Serial No. 14901088.6, Office Action dated Jan. 24, 2020, 6 pages.

* cited by examiner

FIG. 13
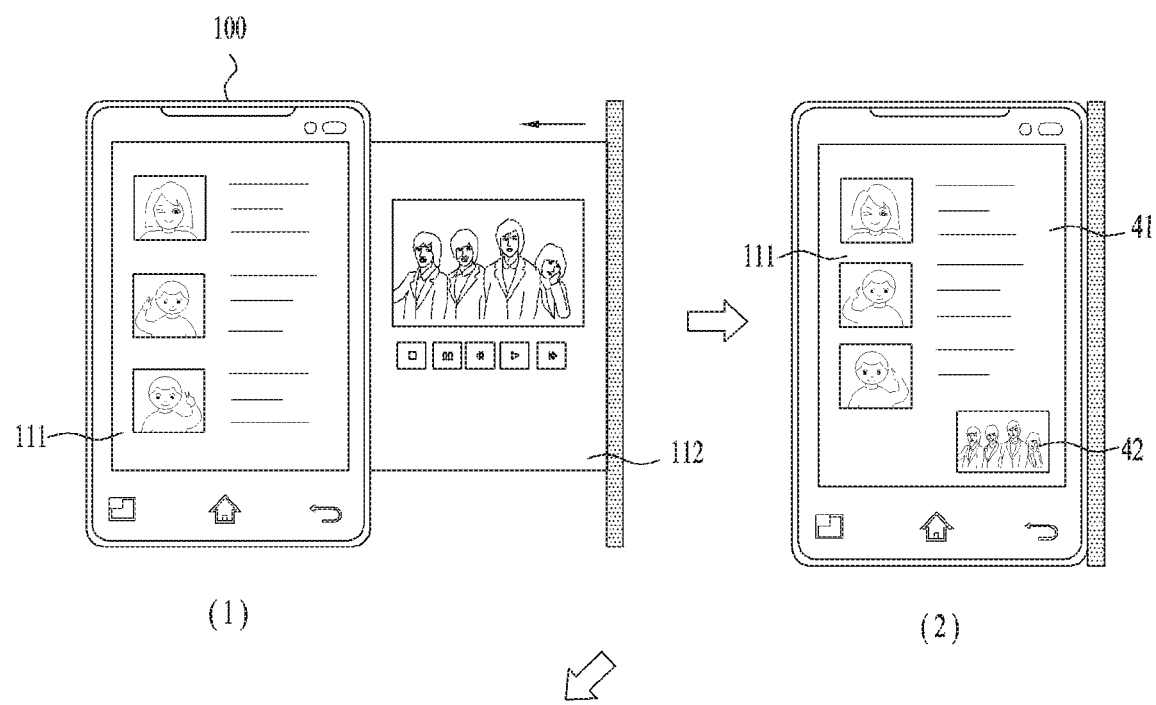
(1)    (2)
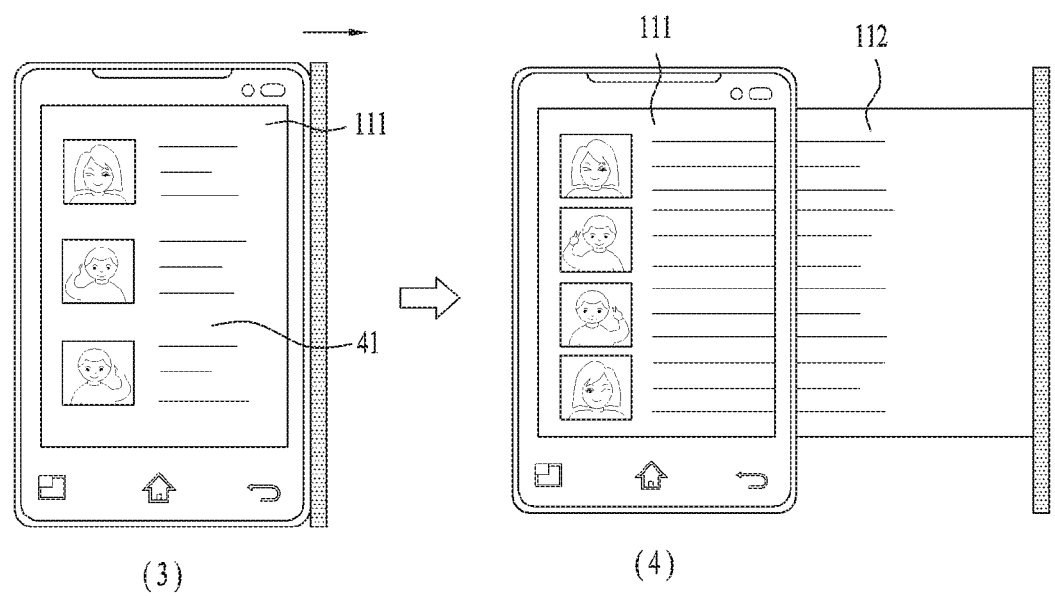
(3)    (4)

FIG. 19
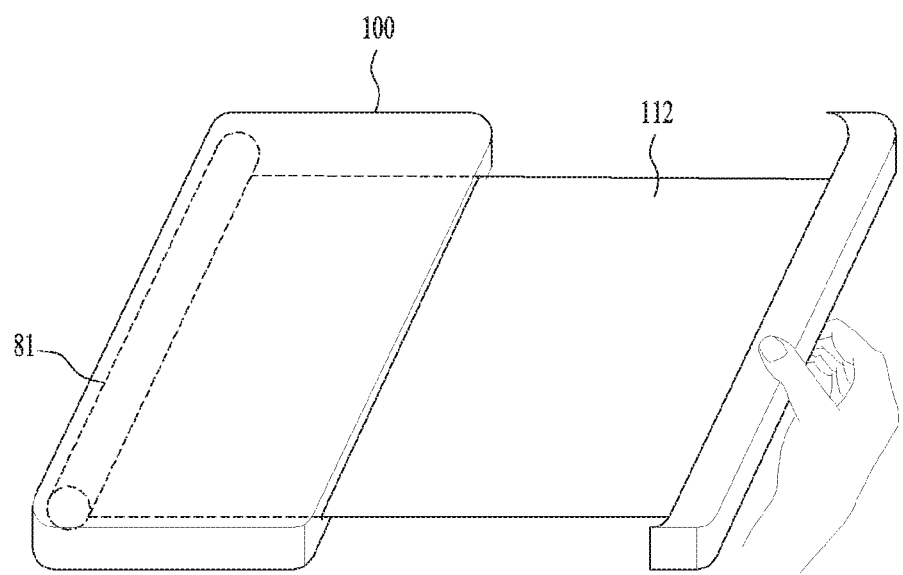
(1)
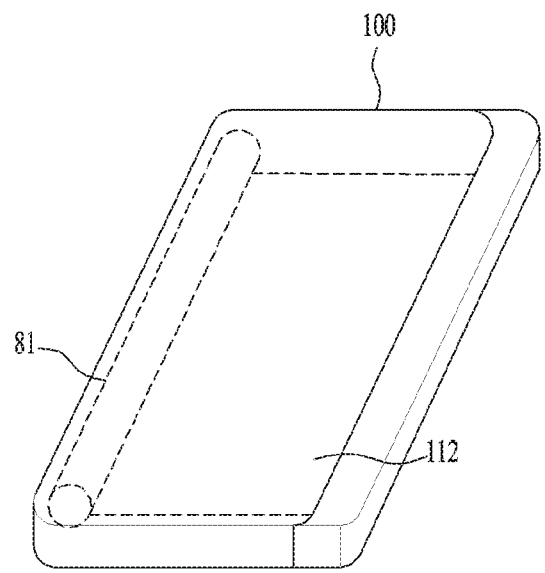
(2)

FIG. 20
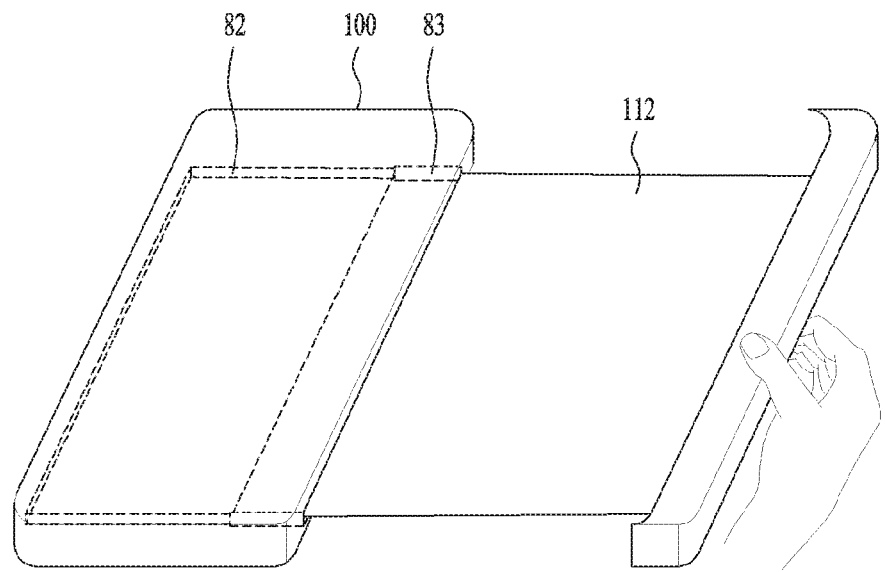
(1)
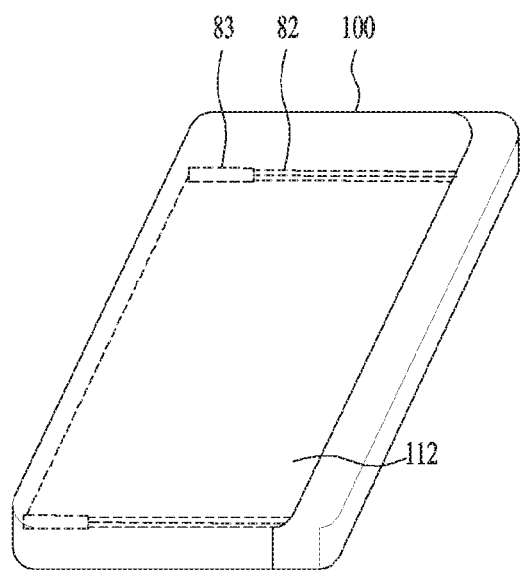
(2)

DISPLAY APPARATUS AND METHOD FOR CONTROLLING SAME

CROSS-REFERENCE TO RELATED APPLICATIONS

This application is the National Stage filing under 35 U.S.C. 371 of International Application No. PCT/KR2014/008260, filed on Sep. 3, 2014, the contents of which are all hereby incorporated by reference herein in its entirety.

TECHNICAL FIELD

The present invention relates to a display apparatus and a method for controlling the same.

BACKGROUND ART

Various electronic devices have been developed in accordance with the development of electronic communication technologies. A display apparatus that includes a touch display, which may allow a user to input a command by touching a screen, has been used, and a display apparatus that includes various displays has studied for commercial use.

Meanwhile, the display apparatus may include a flexible display that may be bent or curved, and may further include a sub display that may be enlarged, in addition to the existing touch display. If the display apparatus further includes a sub display, the user may carry the sub display together with a general display apparatus by storing the sub display in the display apparatus, and may view contents on a large screen by enlarging the sub display.

However, when the user views contents or is using an application, if the sub display is stored in the display apparatus, the display apparatus should output contents (or application) using only one display. At this time, the display apparatus needs to output proper contents suitable for intention of the user.

DISCLOSURE

Technical Problem

An object of the present specification devised to solve the problem of the relate art is to provide a display apparatus that may output an application based on a display state and its direction and a method for controlling the same.

Technical Solution

To achieve the above object, according to one embodiment, a display apparatus comprises a main display for displaying a first application group that includes at least one application; a sub display stored in the display apparatus or exposed therefrom; a sensor unit for sensing whether the display apparatus is rotated; and a controller for controlling the main display, the sub display and the sensor unit, wherein the sub display is exposed from the display apparatus to display a second application group that includes at least one application, and the controller controls the main display unit to display a previously set screen when the sub display is stored, and when the display apparatus is sensed by the sensor unit to have been rotated in a lateral direction within a previously set first time at a previously set angle or more, the controller controls the main display to display the second application group on the main display as a full screen.

The controller may control the main display to display the previously set screen if the sub display is stored after being exposed at a previously set width or more.

Also, the controller may control the main display to display the previously set screen if the sub display is stored at a previously set speed or more.

Meanwhile, the previously set screen may be a screen for displaying the first application group and the second application group at the same time.

Also, the controller may control the main display to display the first application group and the second application group at the same time by dividing the main display.

Also, the controller may control the main display to set transparency to the first application group and the second application group and display the first application group and the second application group at the same time by overlapping them.

Meanwhile, the previously set screen may be a screen for displaying the first application group.

Also, the previously set screen may be a screen for displaying the second application group on one area of the main display as a small screen.

The second application group may include a plurality of applications.

Meanwhile, the controller may perform at least one of an operation for selecting one of a plurality of applications on the basis of an input touch gesture, an operation for controlling a size of a display area of each of the plurality of applications, and an operation for deleting the selected one of the plurality of applications.

If one of the plurality of applications is selected and it is sensed by the sensor unit that the display apparatus is rotated in the lateral direction, the controller may control the main display to display the selected application on the main display.

Also, if it is sensed by the sensor unit that the display apparatus is rotated in the lateral direction, the controller may control the main display to display the first application group on one area as a small screen for the previously set first time.

If it is sensed by the sensor unit that the display apparatus rotated in the lateral direction is rotated in an opposite direction of the lateral direction at a previously set angle or more within the previously set first time, the controller may control the main display to display the first application group on the main display.

If it is sensed by the sensor unit that the display apparatus rotated in the lateral direction is rotated in an opposite direction of the lateral direction at a previously set angle or more within a previously set second time, the controller may control the main display to display the first application group on the main display.

Also, if the sub display of the display apparatus rotated in the lateral direction is exposed within a previously set third time, the controller may control the exposed sub display to display the first application group.

Also, if the sub display of the display apparatus rotated in the lateral direction is exposed after a previously set third time passes, the controller may control the main display and the sub display to display the second application group, which is displayed on the main display, to be enlarged to the sub display.

Meanwhile, the display apparatus may further comprise a grip unit connected with the sub display, displaying an indicator.

The grip unit may include at least one of LED, LCD and OLED.

To achieve the above object, according to one embodiment, a method for controlling a display apparatus comprises the steps of displaying a first application group that includes at least one application on a main display and displaying a second application group that includes at least one application on a sub display exposed from the display apparatus; displaying a previously set screen on the main display when the sub display is stored; and displaying the second application group on the main display as a full screen when the display apparatus is sensed to have been rotated in a lateral direction within a previously set first time at a previously set angle or more.

The method may further comprise the step of displaying the first application group on the main display when it is sensed by a sensor unit that the display apparatus rotated in the lateral direction is rotated in an opposite direction of the lateral direction at a previously set angle or more within the previously set first time.

Advantageous Effects

According to the aforementioned various embodiments, the display apparatus and the method for controlling the same may output an application based on a display state and a direction of the display apparatus in accordance with intention of a user.

The display apparatus and the method for controlling the same may automatically store a sub display.

BRIEF DESCRIPTION OF THE DRAWINGS

FIG. 13 is a diagram illustrating an operation of a display apparatus according to the sixth embodiment.

FIG. 19 is an exemplary diagram illustrating a method for storing a sub display.

FIG. 20 is another exemplary diagram illustrating a method for storing a sub display.

BEST MODE FOR CARRYING OUT THE INVENTION

Hereinafter, the preferred embodiments of the present specification will be described in detail with reference to the accompanying drawings. At this time, although the embodiments of the present specification will be described in detail with reference to the accompanying drawings and the disclosure described by the drawings, it is to be understood that the technical spirits and principles of the present specification are not limited by such embodiments.

Although the terms used in this specification are selected from generally known and used terms considering their functions in the present specification, the terms may be modified depending on intention of a person skilled in the art, practices, or the advent of new technology. Also, in special case, the terms mentioned in the description of the present specification may be selected by the applicant at his or her discretion, the detailed meanings of which are described in relevant parts of the description herein. Accordingly, the terms used herein should be understood not simply by the actual terms used but by the meaning lying within and the description disclosed herein.

Figure 1:
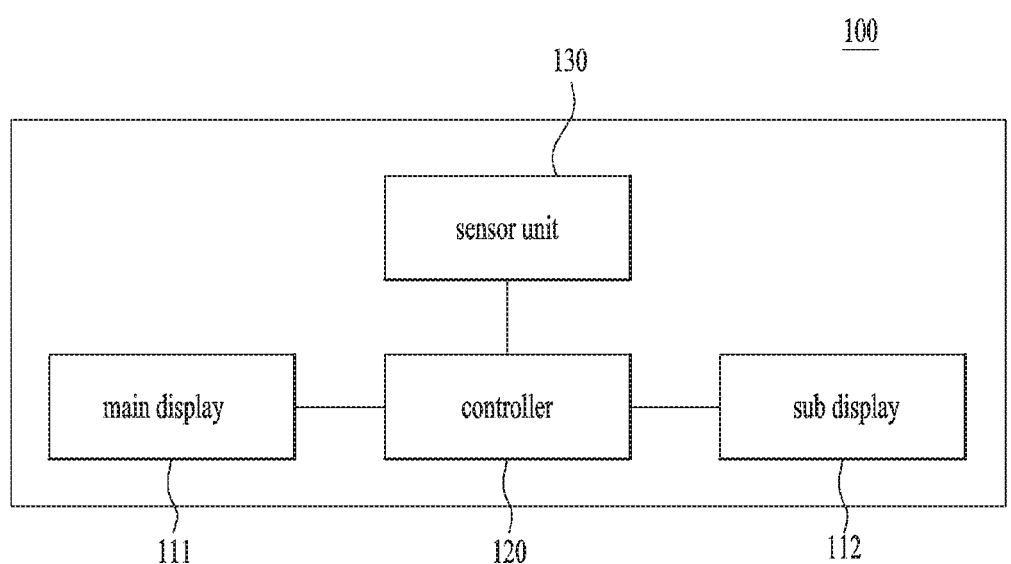
FIG. 1 is a block diagram illustrating a display apparatus according to one embodiment.

FIG. 1 is a block diagram illustrating a display apparatus according to one embodiment.

Referring to FIG. 1, the display apparatus 100 may include a main display 111, a flexible display 112, a controller 120, and a sensor unit 130.

The main display 111 may display a first application group that includes at least one application. The main display 111 may be implemented to be fixed to a body of the display apparatus 100. The first application group may include one or more applications. That is. The main display 111 may display one application or one or more applications. The aforementioned application may include contents, program, software, etc.

The sub display 112 may be stored in the display apparatus 100, or may be exposed out of the display apparatus 100. If the sub display 112 is stored in the display apparatus 100, the display apparatus 100 may be used similarly to a general display apparatus of which main display 111 is only exposed. If the sub display 112 is exposed out of the display apparatus 100, the display apparatus 100 may be used as a display apparatus that includes an enlarged display. The sub display 112 may be implemented as a general display module, a flexible display module, a transparent display module, etc.

The sub display 112 may be exposed to the display apparatus 100 to display a second application group that includes at least one application. In the same manner as the first application group, the second application group may include one or more applications. The sub display 112 may display one application or a plurality of applications.

The main display 111 or the sub display 112 may include a touch recognition layer that recognizes a touch gesture. The touch recognition layer may be formed in a single body with the main display 111 or the sub display 112. Alternatively, the touch recognition layer may be arranged above or below the main display 111 or the sub display 112. Therefore, the a touch gesture contacted on the main display 111 or the sub display 112 may be input through the touch recognition layer. Both the main display 111 and the sub display 112 may include a touch recognition layer.

The controller 120 may control the main display 111, the sub display 112, and the sensor unit 130. The controller 120 may control the main display 111 to display a previously set screen on the main display 111 if the sub display 112 is stored in the display apparatus. If the sub display 112 is stored in the display apparatus 100, the main display 111 of the display apparatus 100 is only exposed to the outside. Therefore, the controller 120 may control the screen displayed on the main display 111.

For example, the previously set screen may at least one of a screen for displaying the first application group and the second application group at the same time, a screen for displaying the first application group only, and a screen for displaying the first application group on a main area and displaying the second application group on one area of the main display 111 at a small screen.

Also, the controller 120 may control the main display 111 to display the second application group on the full screen of the main display 111 if the display apparatus 100 is sensed to be rotated at a previously set angle or more in a lateral direction within a previously set first time. If the sub display 112 is stored and then rotated, it may indicate that the user wants the second application group. Therefore, the display apparatus 100 may display the second application group on the main display 111. However, if the display apparatus 100 is sensed to be rotated at a previously set angle or more in a lateral direction after the first time passes, it may indicate that the user wants the first application group. Therefore, the display apparatus 100 may display the first application group on the main display 111. Also, if the display apparatus 100 is sensed to be rotated in a lateral direction and then rotated in an opposite direction of the lateral direction within a certain time, it may indicate that the user wants the first application group. Therefore, the display apparatus 100 may display the first application group on the main display 111. Various embodiments of the display apparatus 100 will be described below.

The sensor unit 130 may sense whether the display apparatus 100 is rotated. For example, the sensor unit 130 may include an inertia sensor such as an acceleration sensor, a gyro sensor, and a geomagnetic sensor. Whether the display apparatus 100 is rotated may be sensed using the aforementioned acceleration sensor, gyro sensor, geomagnetic sensor, etc.

Also, the sensor unit 130 may transfer a user input or an environment recognized by the device to the controller 120 by using the sensor installed in the device. The sensor unit 130 may include a plurality of sensors. For example, the plurality of sensors may include a gravity sensor, a motion sensor, an inclination sensor, a brightness sensor, an altitude sensor, a smell sensor, a temperature sensor, a depth sensor, a pressure sensor, a bending sensor, an audio sensor, a video sensor, a GPS sensor, and a touch sensor in addition to the aforementioned acceleration sensor, gyro sensor, and geomagnetic sensor.

The display apparatus 100 may further another components in addition to the main display 111, the sub display 112, the controller 112 and the sensor unit 130.

Figure 2:
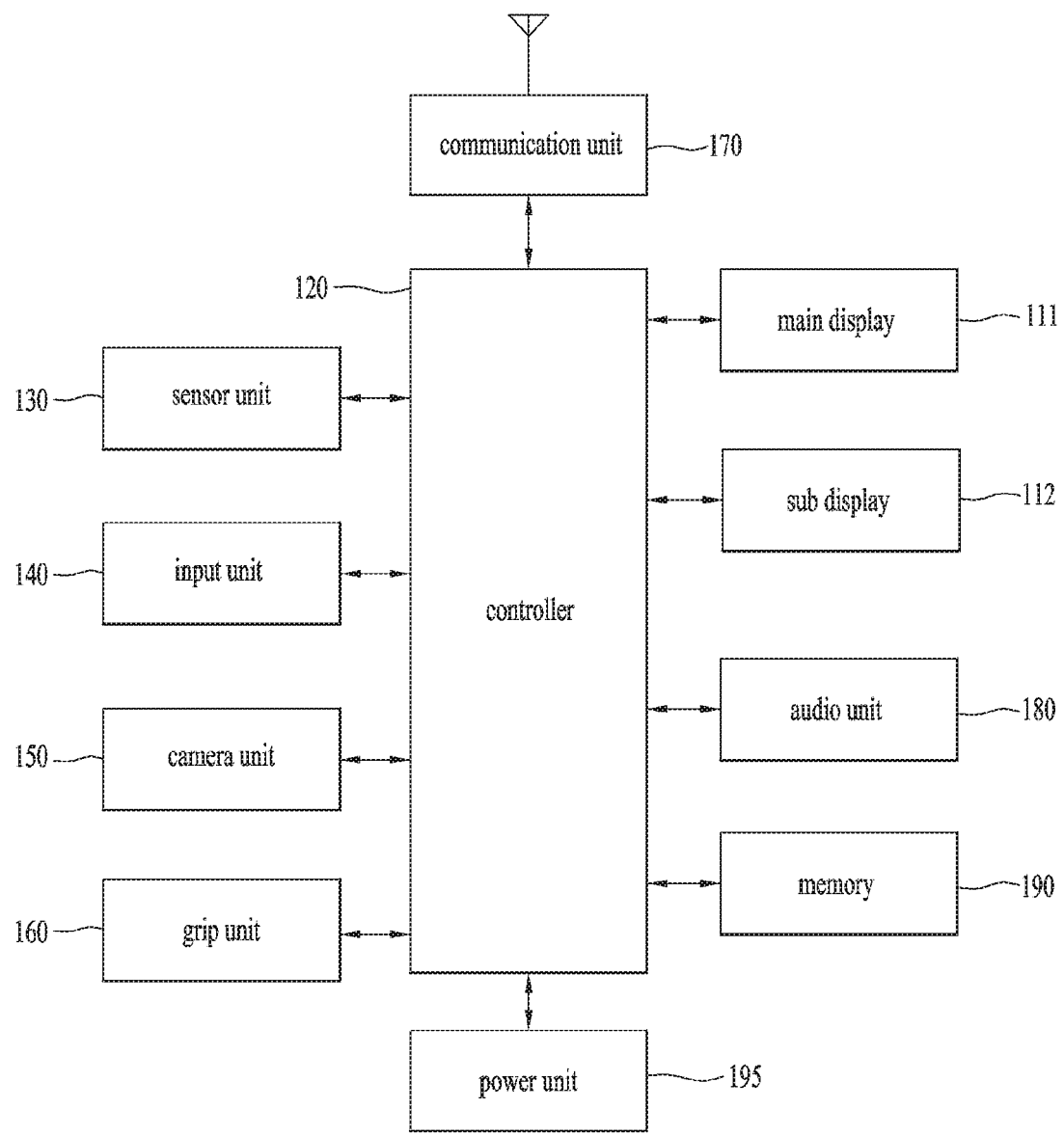
FIG. 2 is a block diagram illustrating a display apparatus according to another embodiment.

FIG. 2 is a block diagram illustrating a display apparatus according to another embodiment.

Referring to FIG. 2, the display apparatus 100 may include a main display 111, a sub display 112, a controller 120, a sensor unit 130, an input unit 140, a camera unit 150, a grip unit 160, a communication unit 170, an audio unit 180, and a memory 190. Since the main display 111, the sub display 112, the controller 120 and the sensor unit 130 are similar to those described in FIG. 1, their description will be omitted in FIG. 2.

The input unit 140 may externally receive a user command. The input unit 140 may be implemented in various manners. For example, the input unit 140 may be implemented as a keyboard, a key pad, a mouse, a touch pad, a button, a soft key, etc. In a broad sense, the input unit 140 may include a microphone, a touch screen, etc. The microphone may receive a user's voice, and the touch screen may receive a touch gesture of the user. As the case may be, the microphone may be included in the audio unit, and the touch screen may be included in the display unit.

The camera unit 150 may perform take photos and moving images. The camera unit 150 may be used as a motion sensor or video sensor. The camera unit 150 may include a plurality of cameras.

The grip unit 160 may be connected with the sub display 112 and thus may be used when the sub display 112 is exposed from the display apparatus 100. The grip unit 160 may display an indicator. The grip unit 160 may include an LED or an auxiliary display. The auxiliary display may be implemented as at least one of LCD or OLED. That is, the grip unit 160 may include at least one of LED, LCD and OLED. The grip unit 160 may display the indicator using LED, or may display the indicator using the auxiliary display.

The communication unit 170 may perform communication with an external network using various protocols and transmit and receive data to and from the external network. The communication unit 170 may be connected with the external network through a wire or wirelessly to transmit and receive digital data to and from the external network.

The audio unit 180 may include an audio output means such as a speaker and an audio input means such as a microphone. The audio unit 180 may be used as an audio sensor.

The memory 190 may store various digital data such as video, audio, photo, moving image and application. For example, the memory 190 may include a RAM, a ROM, a cache memory, a hard disk drive (HDD), a solid state drive (SSD), a CD, a DVD, a Blu-ray disk, floppy disk (FDD), a magnetic disk, a memory card, a flash memory, and a USB memory.

The power unit 195 is a power source connected with a battery or an external power source, and may supply a power to the device.

The display apparatus 100 may be implemented as various types electronic devices. For example, the display apparatus 100 may include a smart phone, a tablet PC, a navigator, and a PMP.

Various embodiments of the display apparatus will be described below.

Figure 3:
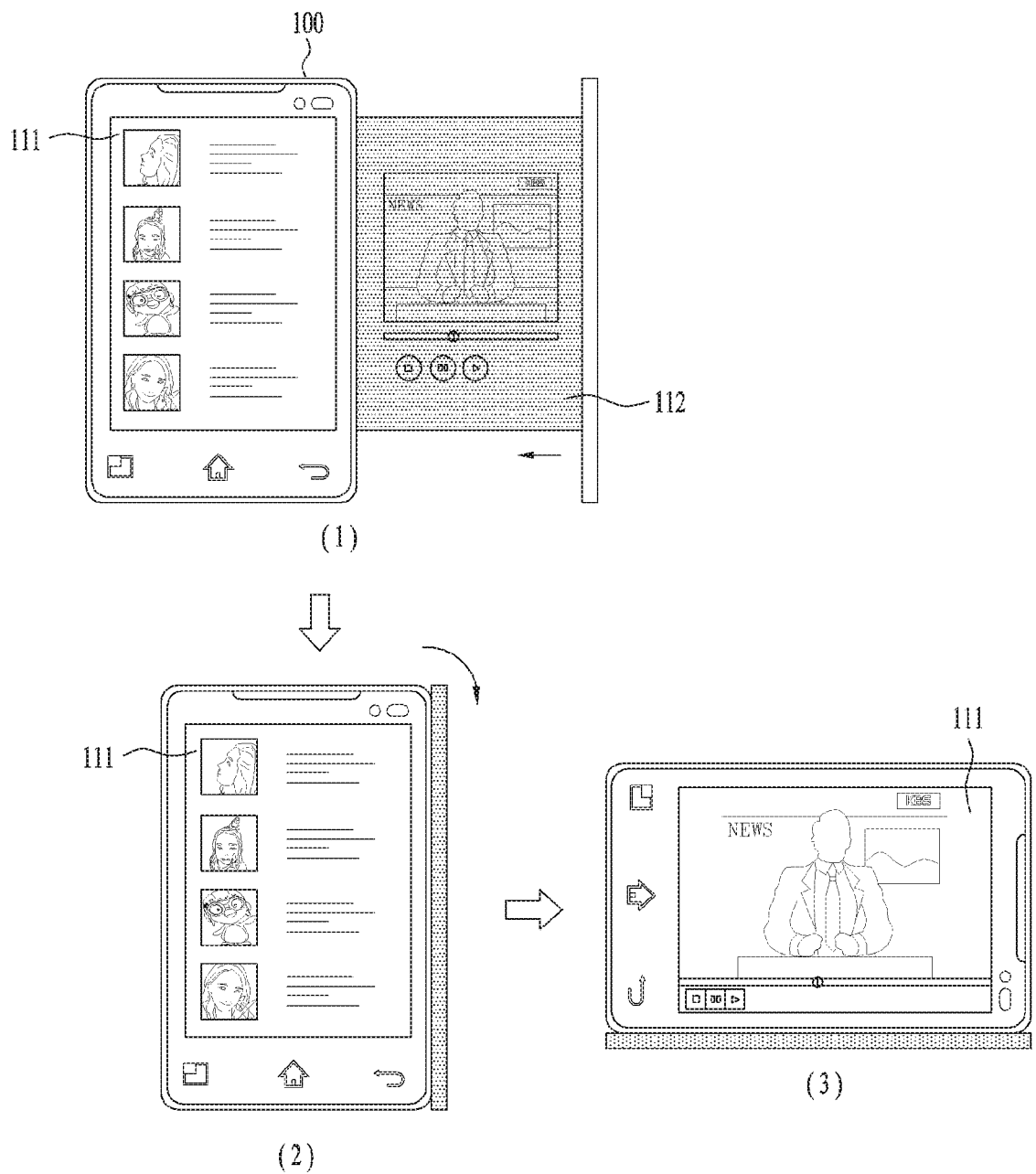
FIG. 3 is an exemplary diagram illustrating a main display screen according to rotation of a display apparatus and storage of a sub display.

FIG. 3 is an exemplary diagram illustrating a main display screen according to rotation of a display apparatus and storage of a sub display.

Referring to FIG. 3(1), the display apparatus 100 from which the sub display 112 is exposed is shown. The display apparatus 100 includes a main display 111 and a sub display 112. The main display 111 may display a first application group, and the sub display 112 may display a second application group. As described above, the first and second application groups may include at least one application. That is, the first and second application groups may mean one application. The application may include contents, program, software, list, etc. As one embodiment, the main display 111 may display a contents list, and the sub display 112 may be stored in the display apparatus 100.

Referring to FIG. 3(2), the display apparatus 100 in which the sub display 112 is stored is shown. If the sub display 112 is stored in the display apparatus 100, the main display 111 may display a previously set screen. For example, the previously set screen may be a screen for displaying the first application group. In FIG. 3(2), the first application group may be a contents list. The display apparatus 100 may be rotated in a lateral direction. The lateral direction may be a right direction or left direction.

Referring to FIG. 3(3), the display apparatus 100 which is rotated in a lateral direction is shown. The display apparatus 100 rotated in a lateral direction may display the second application group on the main display 111. In FIG. 3(3), the second application group may be moving image contents.

When the display apparatus 100 is rotated in a lateral direction, the display apparatus 100 may determine whether to satisfy a previously set time and a previously set angel. That is, if it is determined that the display apparatus 100 is rotated at a previously set angle or more in a lateral direction within a previously set time, the display apparatus may display the second application group on the main display as a full screen. For example, the previously set time may be set to 3 seconds or 5 seconds. The previously set angle may be set to 60 degrees or 70 degrees. That is, if the display apparatus 100 is rotated after the previously set time passes or rotated at the previously set angle or more, the display apparatus 100 may maintain the existing screen without displaying the second application group.

As described above, the display apparatus 100 may display the previously set screen on the main display 111 if the sub display 112 is stored therein. If the sub display 112 is stored in accordance with a certain condition, the display apparatus 100 may display the previously set screen on the main display 111.

Figure 4:
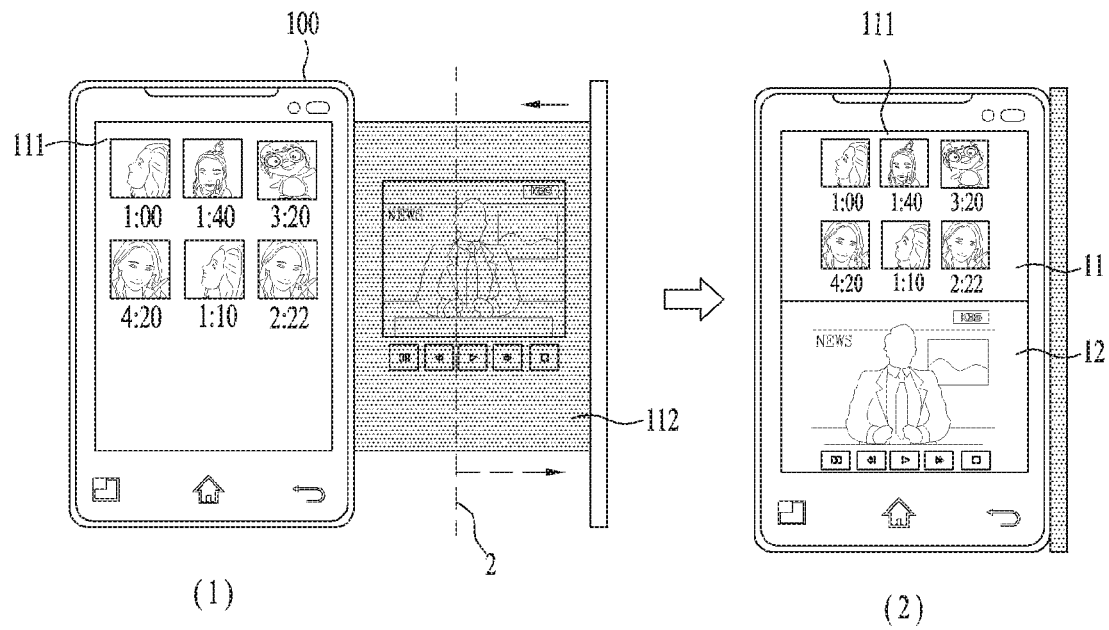
FIG. 4 is an exemplary diagram illustrating a condition that a previously set screen is displayed on a main display.

FIG. 4 is an exemplary diagram illustrating a condition that a previously set screen is displayed on a main display.

Referring to FIG. 4(1), the display apparatus 100 from which the sub display 112 is exposed is shown. The main display 111 may display a first application group, and the sub display 112 may display a second application group. For example, in case of FIG. 4(1), the main display 111 may display a contents list, and the sub display 112 may display moving image contents. The sub display 112 is exposed at a previously set width 2 or more. If the sub display 112 is exposed at a previously set width 2 or more and then stored in the display apparatus 100, the display apparatus 100 may display the previously set screen.

The display apparatus 100 may determine, in various manners, whether the sub display 112 has been exposed at a previously set width or more. For example, a sensor is arranged at a side where the sub display 112 enters and a grip unit, and the display apparatus 100 may sense the exposed width of the sub display 112 using the arranged sensor. Alternatively, the sub display 112 may be connected with a roller or slide module arranged inside the display apparatus 100, so that the sub display 112 may be exposed and stored. The display apparatus 100 may sense the exposed width of the sub display 112 by using rotation times of the roller or a position of the slide module.

In detail, it is assumed that the sub display 112 is rolled in the roller. It is also assumed that the exposed width is 10 cm when the sub display 112 is fully exposed, a previously set width for displaying the previously set screen is 5 cm, and the sub display 112 moves as much as 1 cm when the roller is rotated once. Therefore, the display apparatus 100 may calculate that the exposed width of the sub display 112 is 0 cm when the sub display 112 is fully rolled, the sub display 112 is exposed at a width of 1 cm when the roller is rotated once, and the sub display 112 is exposed at a width of 5 cm when the roller is rotated five times.

If the sub display 112 is connected to the slide module, the display apparatus 100 may calculate the exposed width of the sub display 112 by sensing the position of the slide module using the sensor unit. Alternatively, the sensor is arranged at a certain position (for example, position where the sub display is exposed as much as a previously set width per 1 cm) of a slide lane on which the slide module moves, whereby the display apparatus 100 may calculate the exposed width of the sub display 112 or sense whether the sub display 112 has been exposed as much as the previously set width. In FIG. 4(1), the sub display 112 is exposed at the previously set width or more and then stored in the display apparatus 100.

Referring to FIG. 4(2), the display apparatus 100 in which the sub display 112 is stored is shown. If the sub display 112 is stored in the display apparatus 100, the main display 111 may display the previously set screen. For example, the previously set screen may be a screen for displaying the first application group 11 and the second application group 12 at the same time. The display apparatus 100 may display the first application group 11 on one area by dividing the main display 111 and display the second application group 12 on the other area. In FIG. 4(2), the first application group 11 may be a contents list, and the second application group 12 may be moving image contents. The display apparatus 100 may display the contents list on one area by dividing the main display 111 and display the moving image contents on the other area.

Each area of the main display 111 may be divided at the same area. Alternatively, the display apparatus 100 may divide the area for displaying the first application group 11 to have a larger size.

Figure 5:
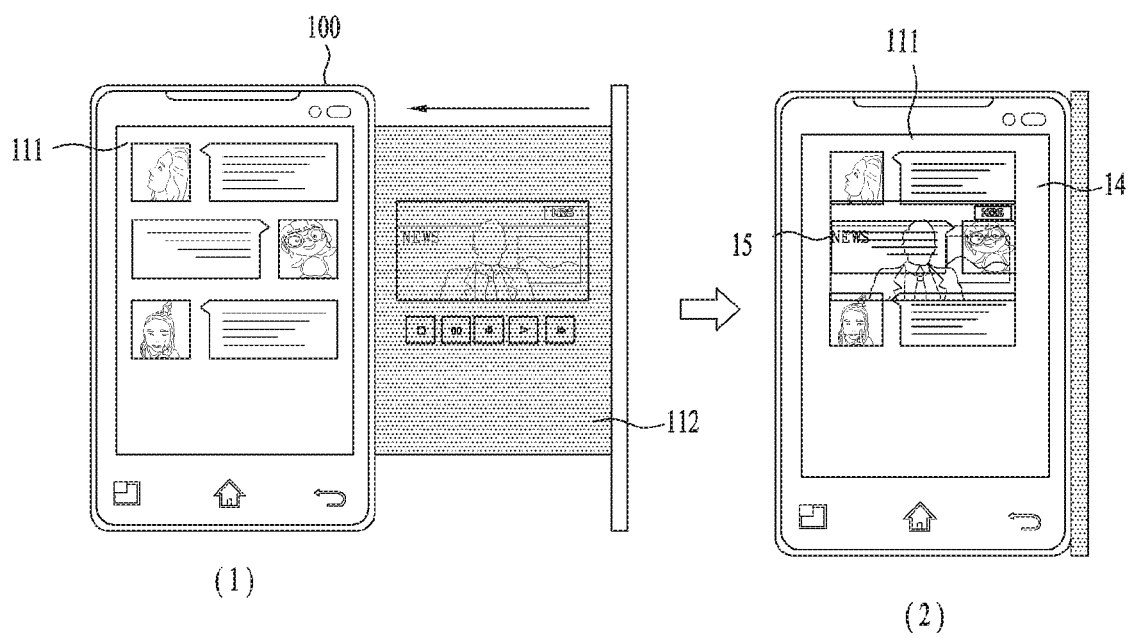
FIG. 5 is an exemplary diagram illustrating a condition that a previously set screen is displayed on a main display.

FIG. 5 is an exemplary diagram illustrating a condition that a previously set screen is displayed on a main display.

Referring to FIG. 5(1), the display apparatus 100 from which the sub display 112 is exposed is shown. The main display 111 may display a first application group, and the sub display 112 may display a second application group. For example, in case of FIG. 5(1), the main display 111 may display a talk application, and the sub display 112 may display moving image contents. If the sub display 112 is stored at a previously set speed or more, the display apparatus 100 may display the previously set screen.

For example, if the sub display 112 is automatically stored, the previously set speed may be set based on the automatic storage speed of the sub display 112 when no external force acts. If the sub display 112 is automatically stored without external force, the display apparatus 100 may display the previously set screen. If the sub display 112 is stored at a speed slower than the automatic storage speed by receiving a force opposite to the automatic storage force from a user, the display apparatus 100 may display the existing display screen. Alternatively, if the sub display 112 is manually stored, the display apparatus may set a random speed to a previously set speed. In FIG. 5(1), the sub display 112 is stored in the display apparatus 100 at the previously set speed or more.

Referring to FIG. 5(2), the display apparatus 100 in which the sub display 112 is stored is shown. If the sub display 112 is stored in the display apparatus 100, the main display 111 may display the previously set screen. For example, the previously set screen may be a screen for displaying the first application group 14 and the second application group 15 at the same time.

The display apparatus 100 may set transparency to the first application group 14 and the second application group 15. The display apparatus 100 may display the first application group 14 and the second application group 15 at the same time by overlapping them. The display apparatus 100 may set the same transparency or different transparency to each of the first application group 14 and the second application group 15. As one embodiment, the display apparatus 100 may set relatively low transparency to the first application group 14 ad set relatively high transparency to the second application group 15.

In FIG. 5(2), the first application group 14 may be a talk application and the second application group 15 may be moving image contents. The display apparatus 100 may set transparency to each of the talk application and the moving image contents and display the talk application and the moving image contents on the main display 111 by overlapping them.

Some embodiments of the previously set screen displayed on the main display 111 after the sub display 112 is stored have been described. Hereinafter, another embodiments of a screen displayed on the main display 111 when the sub display 112 is stored will be described.

Figure 6:
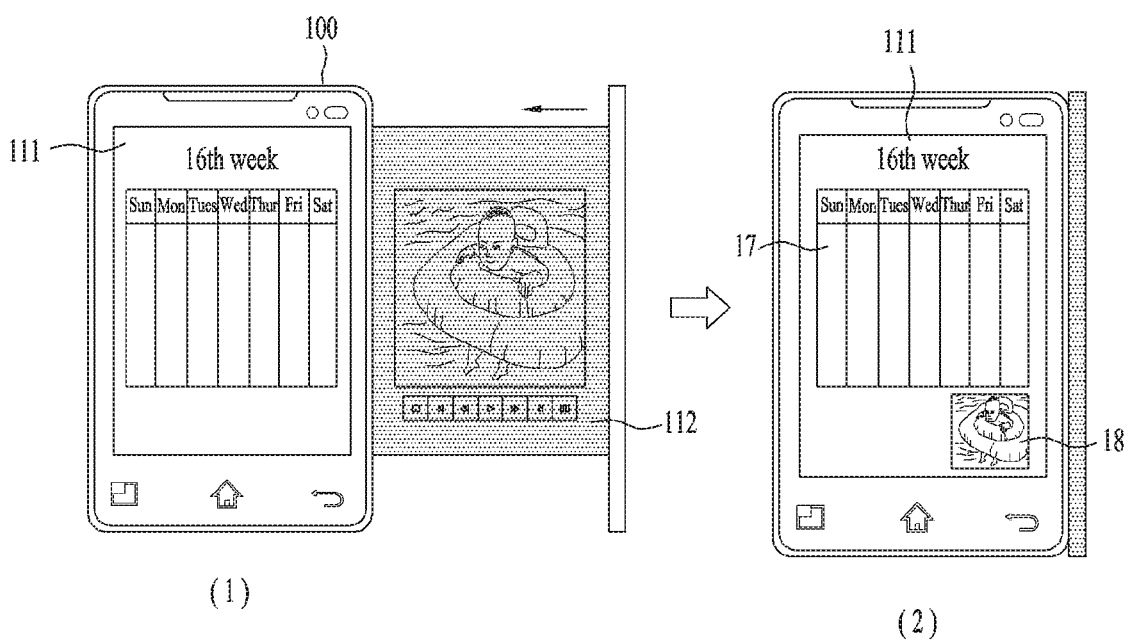
FIG. 6 is an exemplary diagram illustrating a screen displayed on a main display when a sub display is stored.

FIG. 6 is an exemplary diagram illustrating a screen displayed on a main display when a sub display is stored.

Referring to FIG. 6(1), the display apparatus 100 from which the sub display 112 is exposed is shown. The main display 111 may display a first application group, and the sub display 112 may display a second application group. For example, in case of FIG. 6(1), the main display 111 may display a schedule application, and the sub display 112 may display moving image contents. If the sub display 112 is exposed at a previously set width or more and then exposed at a previously set speed or without another condition, the display apparatus 100 may display the previously set screen.

Referring to FIG. 6(2), the display apparatus 100 in which the sub display 112 is stored is shown. If the sub display 112 is stored in the display apparatus 100, the main display 111 may display the previously set screen. For example, the previously set screen may be a screen for displaying the first application group 17 and the second application group 18 at the same time. The display apparatus 100 may display the first application group 17 on the main display 111 for a certain time and display the second application group 18 on one area of the main display 111.

One area where the second application group 18 is displayed may be a random area of the main display 111. One area where the second application group 18 is displayed may move. For example, in FIG. 6(2), although one area where the second application group 18 is displayed may be set to a left lower end of the main display 111, the one area may be set to a right lower end, left upper end or right upper end of the main display 111.

After the sub display 112 is stored in the display apparatus, the display apparatus 100 may display a previously set first screen on the main display 111, and may display a previously set second screen by sensing a rotation direction of the display apparatus 100.

Figure 7:
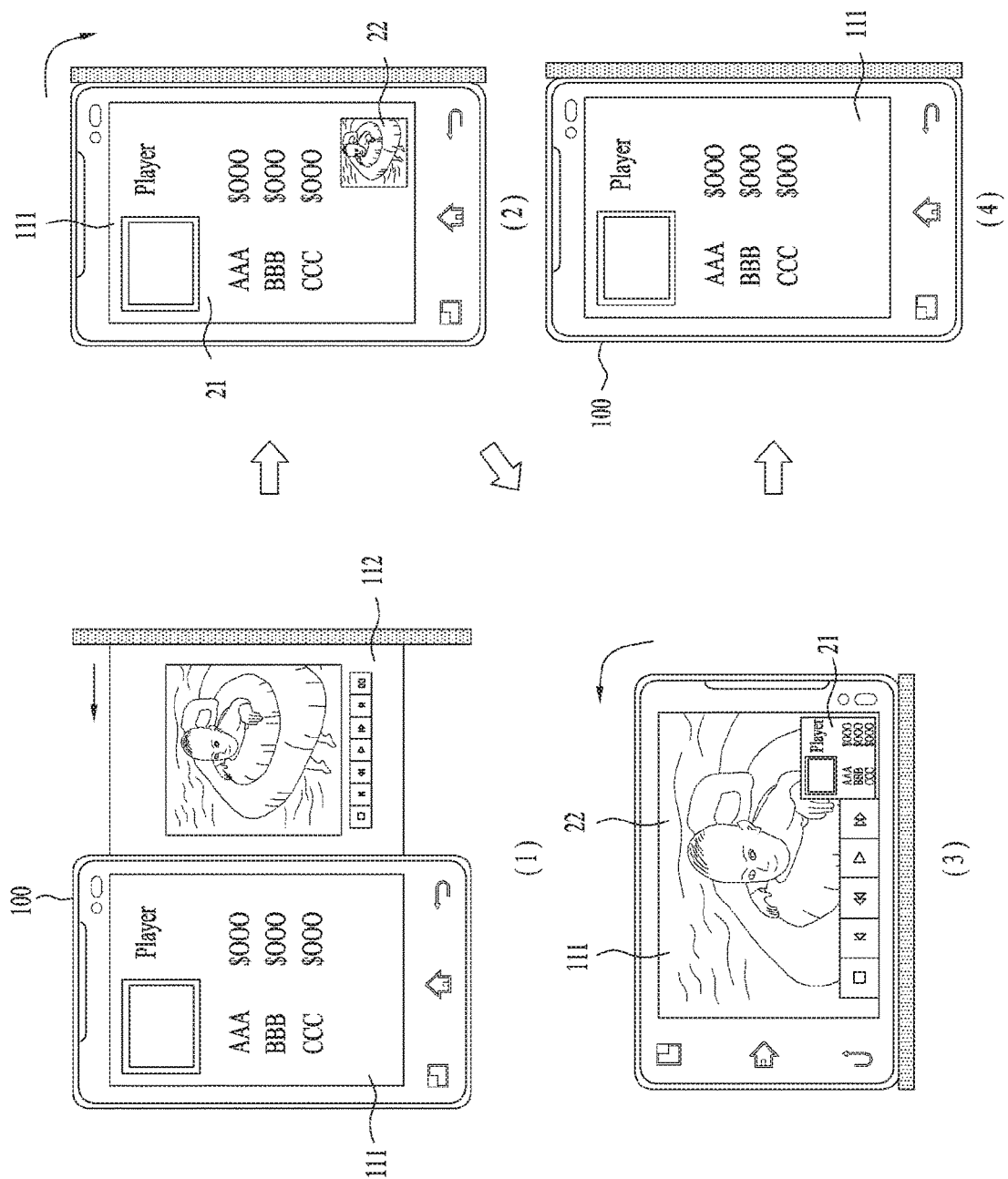
FIG. 7 is a diagram illustrating an operation of a display apparatus according to the first embodiment.

FIG. 7 is a diagram illustrating an operation of a display apparatus according to the first embodiment.

Referring to FIG. 7(1), the display apparatus 100 from which the sub display 112 is exposed is shown. The main display 111 may display a first application group, and the sub display 112 may display a second application group. For example, in case of FIG. 7(1), the main display 111 may display a price comparison application, and the sub display 112 may display moving image contents. The sub display 112 may be stored in the display apparatus 100.

Referring to FIG. 7(2), the display apparatus 100 in which the sub display 112 is stored is shown. If the sub display 112 is stored in the display apparatus 100, the main display 111 may display the previously set screen. For example, the previously set screen may be a screen for displaying the first application group 21 and the second application group 22 at the same time. The display apparatus 100 may display the first application group 21 on the main display 111 and display the second application group 22 on one area of the main display 111.

As described above, the display apparatus 100 may set transparency to each of the first application group 21 and the second application group 22 and display the first application group 21 and the second application group 22 by overlapping them. Or, the display apparatus 100 may divide the main display 111 into two areas, and may display the first application group 21 on one area and display the second application group 22 on the other area. Or, the display apparatus 100 may display only the first application group 21 on the main display 111. When the sub display 112 is stored, various screens displayed on the main display 111 may be applied to other embodiments of the specification.

The display apparatus 100 may sense rotation of a previously set angle or more in a lateral direction.

Referring to FIG. 7(3), the display apparatus 100 rotated in a lateral direction is shown. Although the display apparatus 100 rotated in a right direction is shown in FIG. 7(3), the display apparatus 100 may be rotated in a left direction. If the display apparatus 100 is rotated in a lateral direction, the display apparatus 100 may display the first application group 21 on one area of the main display 111 at a small screen for a certain time. The display apparatus 100 may display the first application group 21 and the second application group 22 by switching the display areas of the first and second application groups 21 and 22.

That is, when the second application group 22 is displayed on one area of the main display 111, the display apparatus 100 may display the first application group 21 on one area of the main display 111 if rotated. When the display apparatus displays the first application group 21 on the second application group 22 by setting transparency to the first and second application groups 21 and 22, the display apparatus 100 may display the second application group 22 on the first application group 21 if rotated. Alternatively, when the display apparatus displays the first application group 21 on the first area and displays the second application group 22 on the second area by dividing the main display 111, the display apparatus may display the second application group 22 on the first area and display the first application group 21 on the second area if rotated.

The display apparatus 100 may be rotated in an opposite direction of the lateral direction along which the display apparatus 100 is rotated.

Referring to FIG. 7(4), the display apparatus 100 rotated in an opposite direction of the lateral direction is shown.

The display apparatus 100 may be rotated at a previously set angle or more in an opposite direction of the lateral direction within a previously set time. As one embodiment, the previously set time may be a time counted from the time when the sub display 112 is stored. That is, if the previously set time is 5 seconds, when the display apparatus is rotated in an opposite direction of the lateral direction after being rotated in the lateral direction within 5 seconds after the sub display 112 is stored, the display apparatus 100 may display a previous screen.

As another embodiment, the previously set time may be a time counted from the time when the display apparatus 100 is rotated in the lateral direction. That is, if the previously set time is 3 seconds, when the display apparatus is rotated in an opposite direction of the lateral direction within 3 seconds after being rotated in the lateral direction, the display apparatus 100 may display a previous screen.

The previously set angle means an angle that may be sensed that the display apparatus 100 is rotated. For example, the previously set angle may be set to a certain value such as 60 degrees and 70 degrees.

If the display apparatus 100 is rotated in the opposite direction of the lateral direction, the display apparatus 100 may display the previous screen. That is, if the display apparatus 100 displays the first application group 21 on the main display 111 before being rotated, the display apparatus 100 may display the first application group 21 on the main display 111 after being rotated in the opposite direction of the lateral direction.

That is, if the display apparatus 100 rotated in the lateral direction is rotated in the opposite direction of the lateral direction at a previously set angle or more within a previously set time, the display apparatus 100 may display the first application group 21 on the main display 111.

Figure 8:
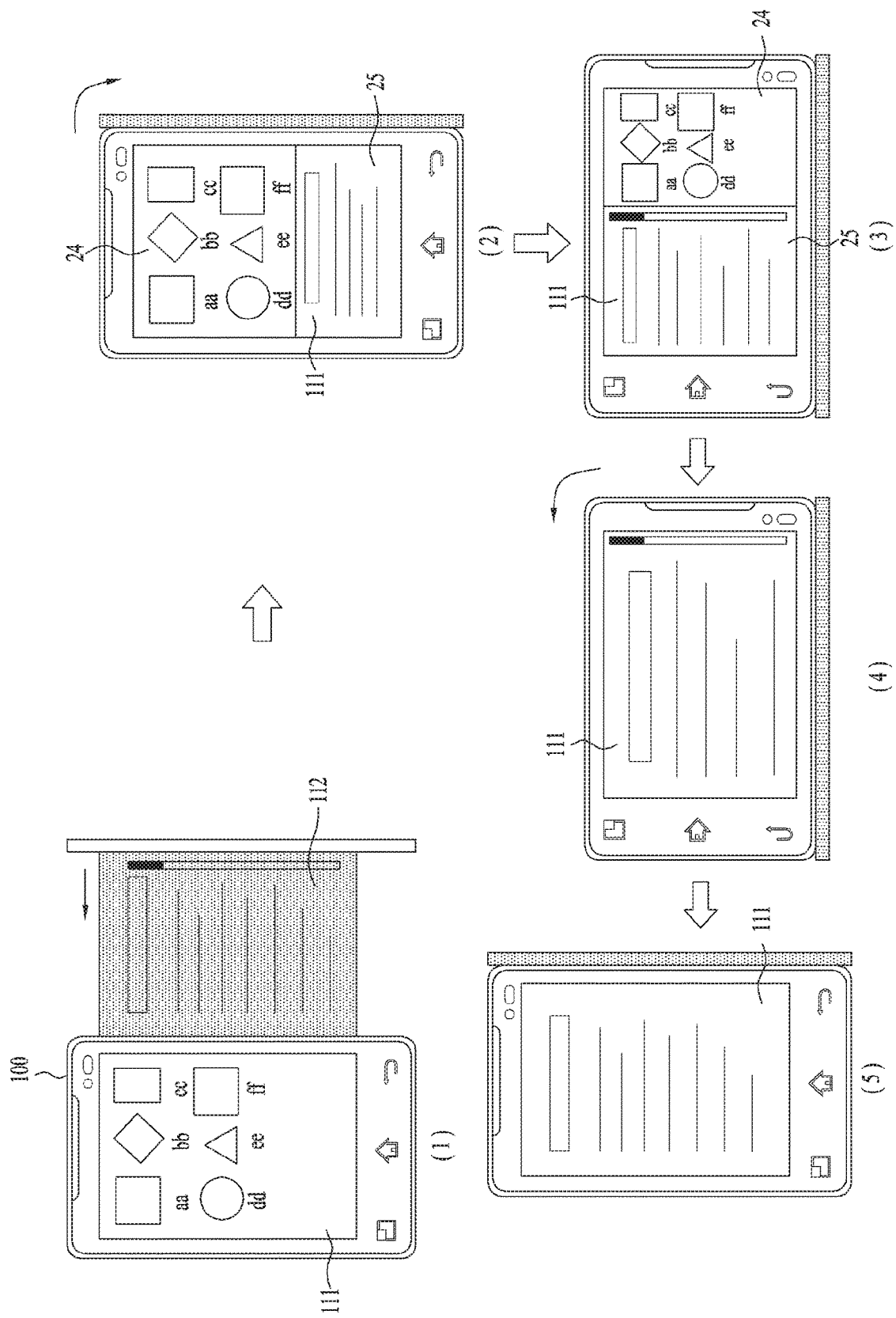
FIG. 8 is a diagram illustrating an operation of a display apparatus according to the second embodiment.

FIG. 8 is a diagram illustrating an operation of a display apparatus according to the second embodiment.

Referring to FIG. 8(1), the display apparatus 100 from which the sub display 112 is exposed is shown. The main display 111 may display a first application group, and the sub display 112 may display a second application group. For example, the first application group may be an icon list, and the second application group may be a web application or electronic book application. The sub display 112 may be stored in the display apparatus 100.

Referring to FIG. 8(2), the display apparatus 100 in which the sub display 112 is stored is shown. The main display 111 may display the first application group 24 and the second application group 25 together. For example, the display apparatus 100 may divide the main display 111 into two areas, and may display the first application group 24 on an upper area and display the second application group 25 on a lower area. The display apparatus 100 may be rotated in a lateral direction.

Referring to FIG. 8(3), the display apparatus 100 rotated in a lateral direction is shown. The display apparatus 100 may rotate a direction of an application displayed on the main display 111 in accordance with the rotation direction. Also, the display apparatus 100 may switch the area where the first application group 24 is displayed and the area where the second application group 25 is displayed. Switching of the display area does not mean switching of the display areas of the first and second application groups 24 and 25 but means switching of an application group of a priority order before rotation and an application group of a priority order after rotation. Therefore, although the display areas of the first and second application groups may be seen to be switched before and after rotation as shown in FIG. 7, the display areas may be seen to be maintained equally before and after rotation as shown in FIG. 8.

The display apparatus 100 may simultaneously display the first application group 24 and the second application group 25 for a previously set time.

Referring to FIG. 8(4), the display apparatus in which one application group is displayed is shown. The display apparatus 100 may display only one application group after the previously set time passes. As described in FIG. 8(3), the display apparatus 100 may set a priority order to one of the first and second application groups 24 and 25. Therefore, if the previously set time passes, the display apparatus 100 may display only one application group to which a priority order is set. For example, in FIG. 8(4), since the display apparatus 100 has set the priority order to the second application group 25, the display apparatus 100 may display only the second application group 25 on the main display if the previously set time passes.

The display apparatus 100 may be rotated in an opposite direction of the lateral direction along which the display apparatus 100 is rotated.

Referring to FIG. 8(5), the display apparatus 100 rotated in an opposite direction of the lateral direction is shown. The display apparatus 100 may be rotated again in the opposite direction of the lateral direction after a certain time passes. Since the display apparatus is rotated in the opposite direction of the lateral direction within a certain time in FIG. 7, the display apparatus may display the previous screen. However, Since the display apparatus is rotated in the opposite direction of the lateral direction after a certain time in FIG. 8, the display apparatus displays a currently displayed screen. That is, in FIG. 8, the second application group 25 displayed on the main display 111 may be displayed by only direction switching in accordance with the rotation direction of the display apparatus 100.

Meanwhile, the display apparatus 100 may display the first application group and the second application group at the same time, and may switch the display area of the first application group and the display area of the second application group.

Figure 9:
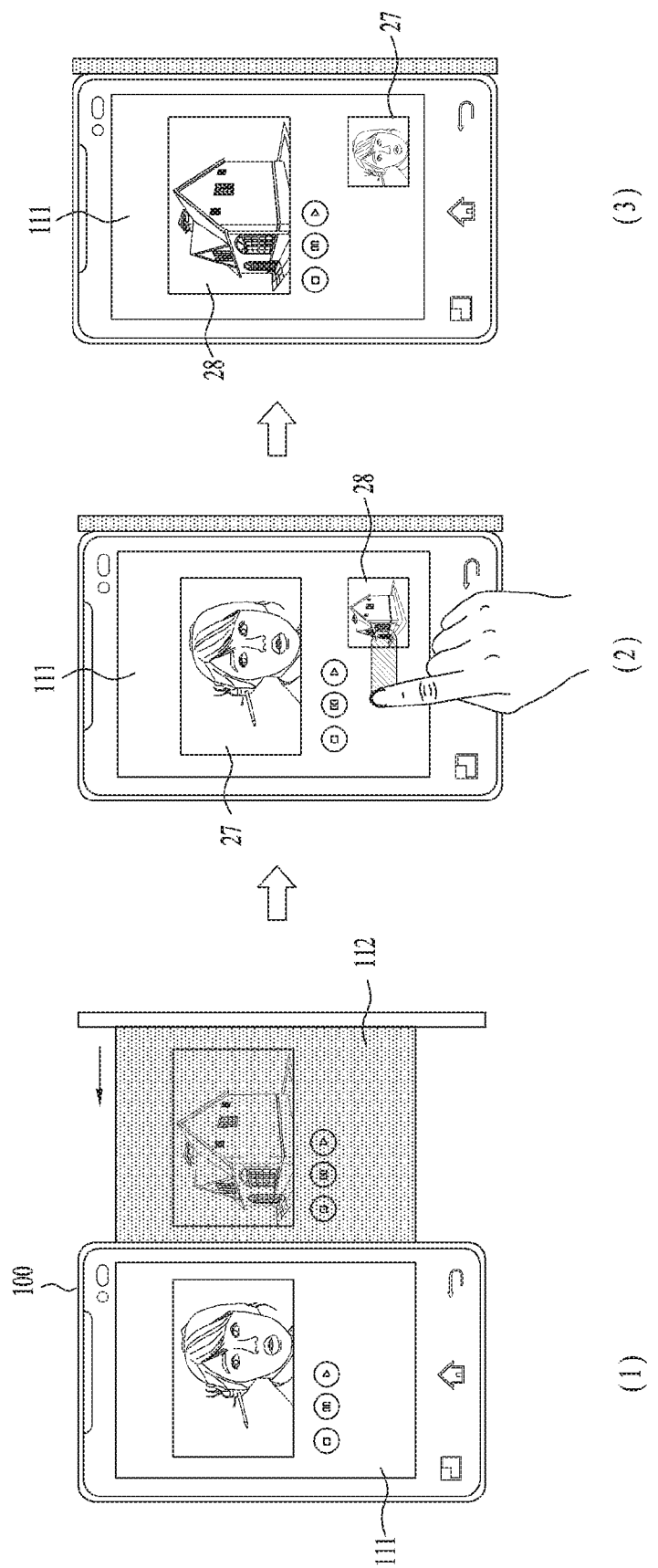
FIG. 9 is a diagram illustrating an embodiment that an area of an application displayed on a main display is switched.

FIG. 9 is a diagram illustrating an embodiment that an area of an application displayed on a main display is switched.

Referring to FIG. 9(1), the display apparatus 100 from which the sub display 112 is exposed is shown. The main display 111 may display a first application group, and the sub display 112 may display a second application group. For example, the first application group and the second application group may be moving image applications. The sub display 112 may be stored in the display apparatus 100.

Referring to FIG. 9(2), the display apparatus 100 in which the sub display 112 is stored is shown. The main display 111 may display the first application group 24 and the second application group 25 on the main display 111 at the same time. For example, the display apparatus 100 may display the first application group 27 on a full area of the main display 111 and display the second application group 28 on one area of the main display 111. The display apparatus 100 may receive a gesture for selecting and moving the second application group 28 from a user. For example, the gesture for selecting and moving the second application group 28 may be a touch and drag gesture, or may be a rub gesture. The display apparatus 100 may perform an operation in accordance with the input gesture.

Referring to FIG. 9(3), the display apparatus 100 is shown in which a display area of the first application group 27 and a display area of the second application group 28 are switched. The display apparatus 100 may display the second application group 28 on a full area of the main display 111 in accordance with the input gesture, and may display the first application group 27 on one area of the main display 111.

Meanwhile, the display apparatus 100 may control a sound volume in accordance with a priority order of the application groups and storage of the sub display 112. That is, if a moving image is displayed on each of the main display 111 and the sub display 112 as shown in FIG. 9(1), the display apparatus 100 may output a sound of the selected moving image as a main sound. As one embodiment, if the second application group 28 displayed on the sub display 112 is selected, the display apparatus 100 may output the sound of the second application group 28 as a main sound.

As shown in FIG. 9(2), if the sub display 112 is stored in the display apparatus 100, the display apparatus 100 may switch the sound of the first application group 27 displayed on the main display 111 as a main sound.

As shown in FIG. 9(3), if the second application group 28 is switched to the full area of the main display 111 and then displayed, the display apparatus 100 may switch the sound of the second application group 28 to the main sound.

After the display apparatus 100 is rotated in the lateral direction, the sub display 112 may be exposed again.

Figure 10:
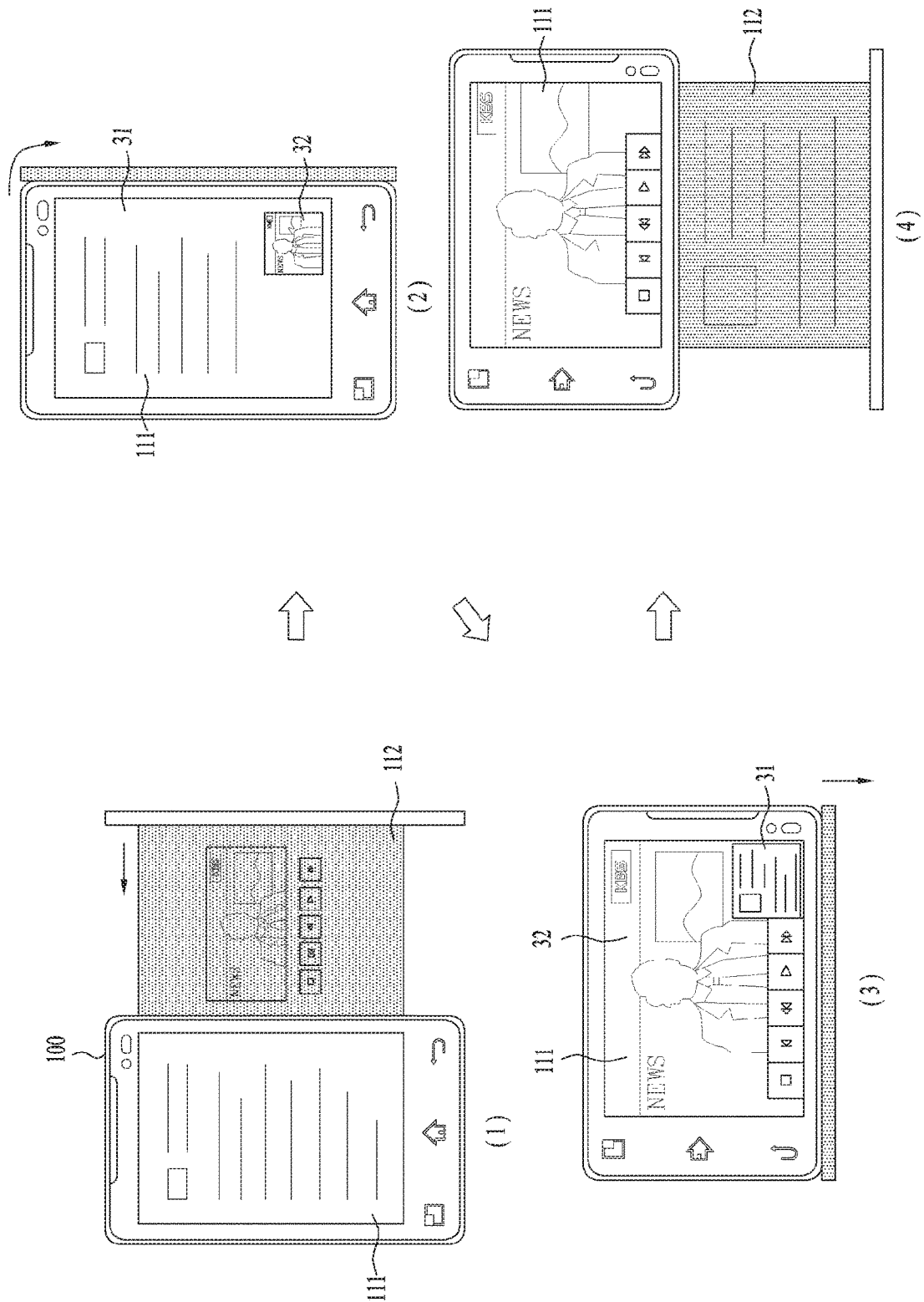
FIG. 10 is a diagram illustrating an operation of a display apparatus according to the third embodiment.

FIG. 10 is a diagram illustrating an operation of a display apparatus according to the third embodiment.

Referring to FIG. 10(1), the display apparatus 100 from which the sub display 112 is exposed is shown. The main display 111 may display a first application group, and the sub display 112 may display a second application group. For example, the first application group may be a web application or electronic book application, and the second application group may be a moving image application. The sub display 112 may be stored in the display apparatus 100.

Referring to FIG. 10(2), the display apparatus 100 in which the sub display 112 is stored is shown. The display apparatus 100 may display the first application group 31 and the second application group 32 on the main display 111 at the same time. For example, the display apparatus 100 may display the first application group 31 on a full area of the main display 111 and display the second application group 32 on one area of the main display 111. The display apparatus 100 may be rotated in a lateral direction.

Referring to FIG. 10(3), the display apparatus 100 rotated in a lateral direction is shown. If the display apparatus 100 is rotated, the display apparatus 100 may display the first application group 31 and the second application group 32 at the same time for a previously set time. If the display apparatus 100 is rotated, the display apparatus 100 may display the second application group 32 on the full area of the main display 111 and display the first application group 31 on one area of the main display 111. The sub display 112 may be exposed within a previously set time.

Referring to FIG. 10(4), the display apparatus 100 from which the sub display 112 is exposed is shown. If the sub display 112 is exposed within the previously set time, the main display 111 may display the second application group 32, and the sub display 112 may display the first application group 31.

That is, if the sub display 112 of the display apparatus 100 rotated in a lateral direction is exposed within the previously set time, the sub display 112 may display the first application group 31.

Meanwhile, the sub display 112 may be exposed after the previously set time passes.

Figure 11:
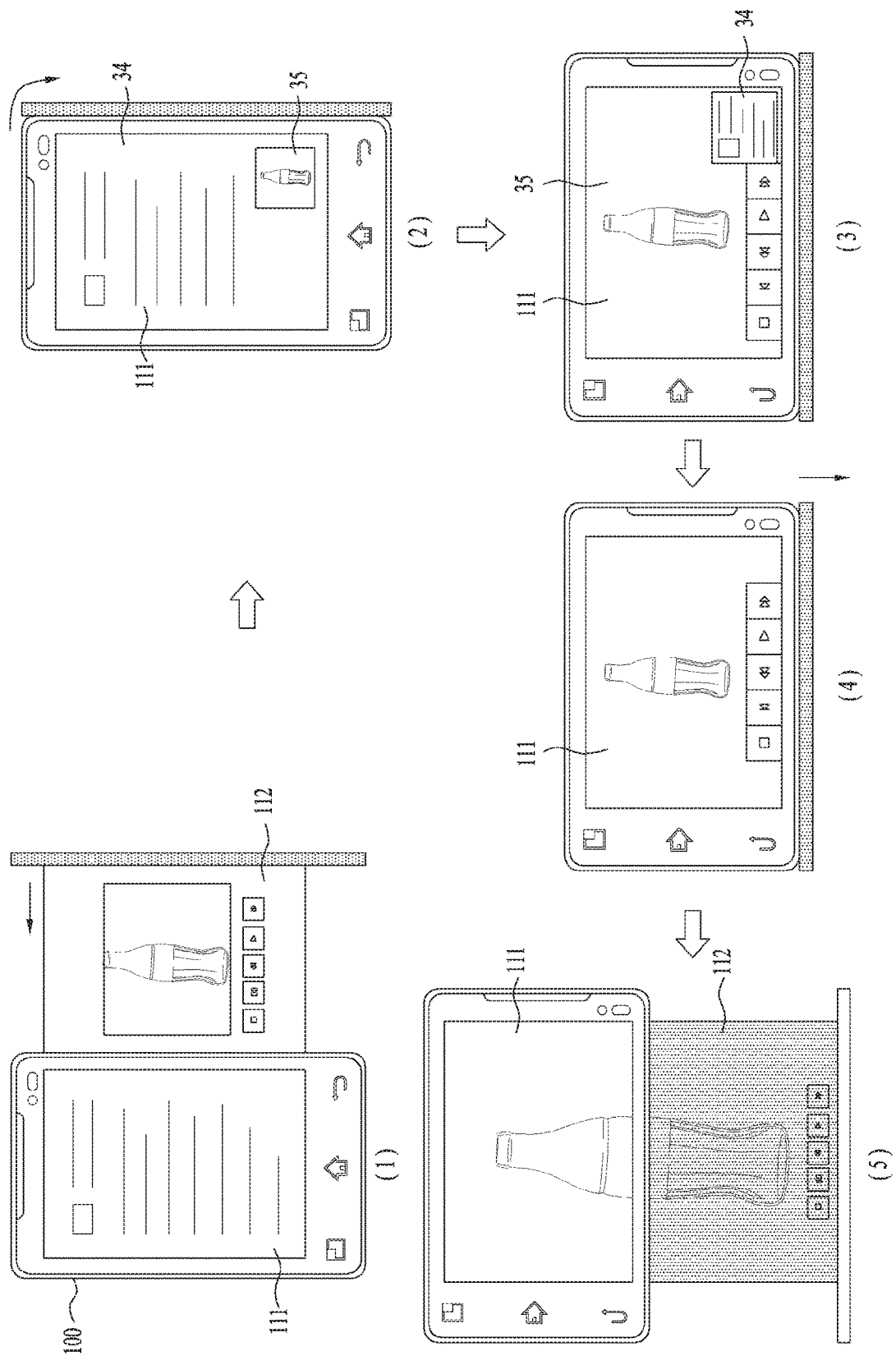
FIG. 11 is a diagram illustrating an operation of a display apparatus according to the fourth embodiment.

FIG. 11 is a diagram illustrating an operation of a display apparatus according to the fourth embodiment.

Referring to FIG. 11(1), the display apparatus 100 from which the sub display 112 is exposed is shown. The main display 111 may display a first application group, and the sub display 112 may display a second application group. For example, the first application group may be an electronic book application or web application, and the second application group may be a moving image application. The sub display 112 may be stored in the display apparatus 100.

Referring to FIG. 11(2), the display apparatus 100 in which the sub display 112 is stored is shown. The display apparatus 100 may display the first application group 34 and the second application group 35 on the main display 111 at the same time. For example, the display apparatus 100 may display the first application group 34 on a full area of the main display 111 and display the second application group 35 on one area of the main display 111. The display apparatus 100 may be rotated in a lateral direction.

Referring to FIG. 11(3), the display apparatus 100 rotated in a lateral direction is shown. If the display apparatus 100 is rotated, the display apparatus 100 may display the first application group 34 and the second application group 35 at the same time for a previously set time. If the display apparatus 100 is rotated, the display apparatus 100 may display the second application group 35 on the full area of the main display 111 and display the first application group 34 on one area of the main display 111.

Referring to FIG. 11(4), a screen displayed on the main display 111 after a previously set time passes is shown. For example, the previously set time may be set to 3 seconds or 5 seconds. If the previously set time passes, the main display 111 may display the second application group 35 only. That is, if the previously set time passes, the display apparatus 100 may allow the application group displayed on one area of the main display 111 to disappear.

Referring to FIG. 11(5), the display apparatus 100 from which the sub display 112 is exposed is shown. If the sub display 112 is exposed after a previously set time passes, the main display 111 and the sub display 112 may display the first application group 31 by enlarging it.

That is, if the sub display 112 of the display apparatus 100 rotated in a lateral direction is exposed after the previously set time passes, the display apparatus 100 may display the second application group 35, which is displayed on the main display 111, to be enlarged to the sub display 112.

After the sub display 112 is stored in the display apparatus, the sub display 112 may be exposed again without rotation of the display apparatus 100.

Figure 12:
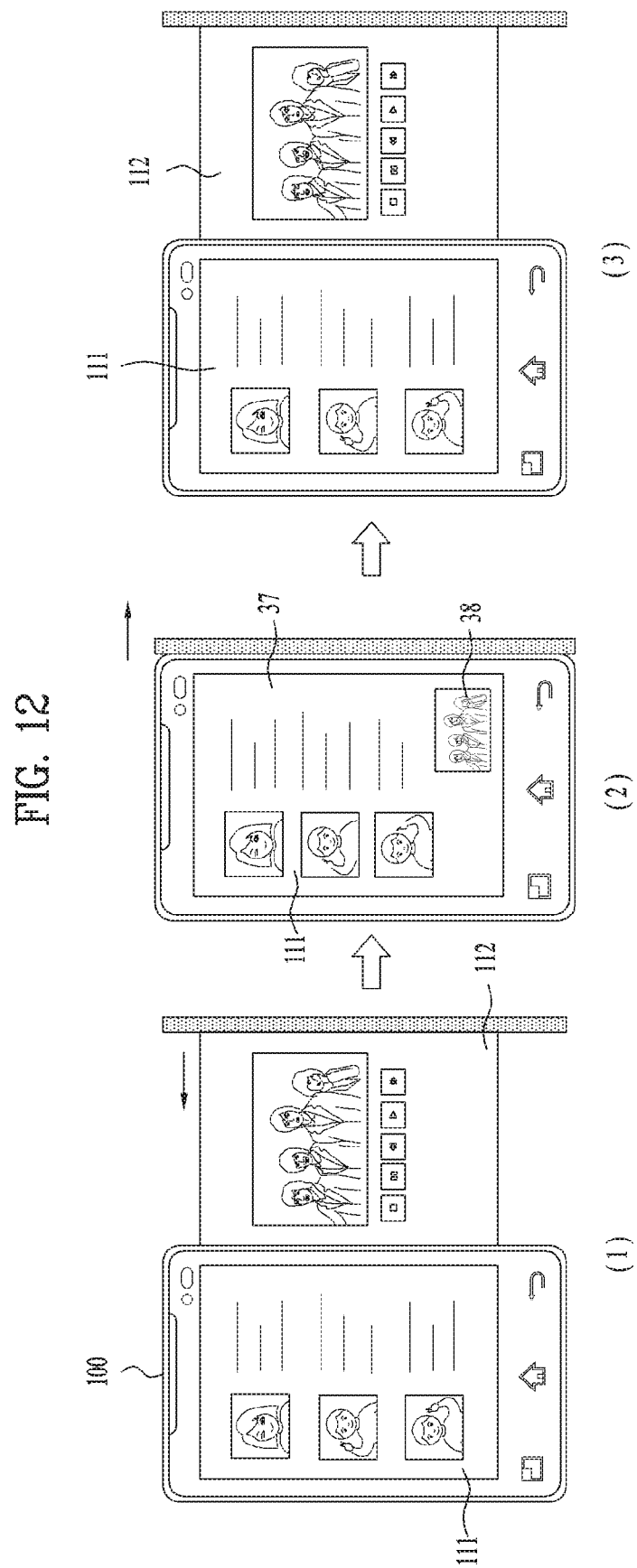
FIG. 12 is a diagram illustrating an operation of a display apparatus according to the fifth embodiment.

FIG. 12 is a diagram illustrating an operation of a display apparatus according to the fifth embodiment.

Referring to FIG. 12(1), the display apparatus 100 from which the sub display 112 is exposed is shown. The main display 111 may display a first application group, and the sub display 112 may display a second application group. For example, the first application group may be a moving image list, and the second application group may be a moving image application. The sub display 112 may be stored in the display apparatus 100.

Referring to FIG. 12(2), the display apparatus 100 in which the sub display 112 is stored is shown. The display apparatus 100 may display the first application group 37 and the second application group 38 on the main display 111 at the same time for a previously set time. For example, the display apparatus 100 may display the first application group 37 on a full area of the main display 111 and display the second application group 38 on one area of the main display 111. The sub display 112 may be exposed again within the previously set time.

Referring to FIG. 12(3), the display apparatus 100 from which the sub display 112 is exposed is shown. If the sub display 112 is exposed within the previously set time, the main display 111 may display the first application group 37, and the sub display 112 may display the second application group 38.

That is, if the sub display 112 of the display apparatus 100 is exposed within the previously set time, the sub display 112 may display the second application group 38.

Meanwhile, the sub display 112 may be exposed after the previously set time passes.

FIG. 13 is a diagram illustrating an operation of a display apparatus according to the sixth embodiment.

Referring to FIG. 13(1), the display apparatus 100 from which the sub display 112 is exposed is shown. The main display 111 may display a first application group, and the sub display 112 may display a second application group. For example, the first application group may be a moving image list, and the second application group may be a moving image application. The sub display 112 may be stored in the display apparatus 100.

Referring to FIG. 13(2), the display apparatus 100 in which the sub display 112 is stored is shown. The display apparatus 100 may display the first application group 41 and the second application group 42 on the main display 111 at the same time. For example, the display apparatus 100 may display the first application group 41 on a full area of the main display 111 and display the second application group 42 on one area of the main display 111.

Referring to FIG. 13(3), a screen displayed on the main display 111 after a previously set time passes is shown. For example, the previously set time may be set to 3 seconds or 5 seconds. If the previously set time passes, the main display 111 may display the first application group 41 only. That is, if the previously set time passes, the display apparatus 100 may allow the application group displayed on one area of the main display 111 to disappear.

Referring to FIG. 13(4), the display apparatus 100 from which the sub display 112 is exposed is shown. If the sub display 112 is exposed after the previously set time passes, the main display 111 and the sub display 112 may display the first application group 41 by enlarging it.

That is, if the sub display 112 of the display apparatus 100 is exposed after the previously set time passes, the main display 111 and the sub display 112 may display the first application group 41 which is enlarged.

Meanwhile, at least one of the first application group and the second application group may include a plurality of applications.

Figure 14:
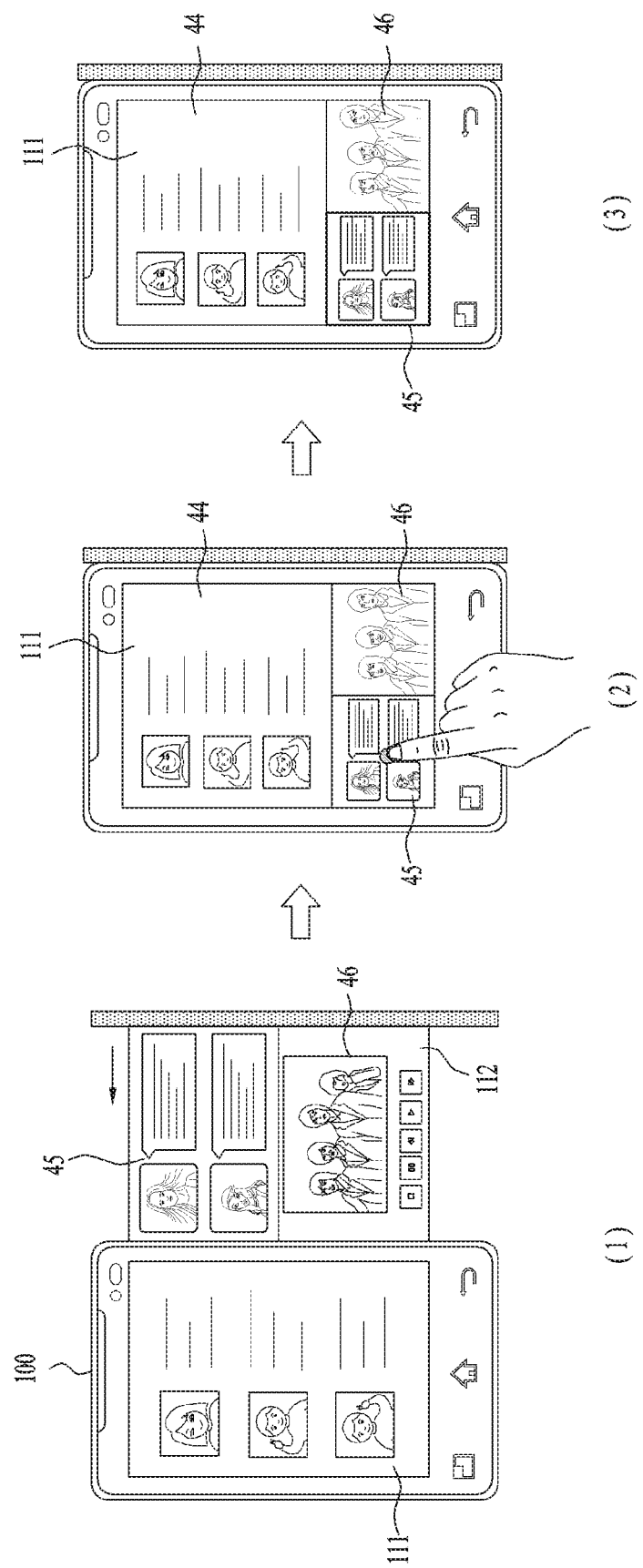
FIG. 14 is a diagram illustrating an operation for selecting one of a plurality of applications displayed on a sub display according to one embodiment.

FIG. 14 is a diagram illustrating an operation for selecting one of a plurality of applications displayed on a sub display according to one embodiment.

Referring to FIG. 14(1), the display apparatus 100 from which the sub display 112 is exposed is shown. The main display 111 may display a first application group, and the sub display 112 may display a second application group. The second application group may include a plurality of applications. For example, the first application group may be a moving image list, and the second application group may include a talk application 45 and a moving image application 46.

Referring to FIG. 14(2), the display apparatus 100 in which the sub display 112 is stored is shown. The display apparatus 100 may display the first application group and the second application group on the main display 111 at the same time for a previously set time. For example, the display apparatus 100 may divide the main display 111 into three areas. The three areas may include one main area and two sub areas. The display apparatus 100 may display the moving image list 44 included in the first application group on the main area and display the talk application 45 and the moving image application 46 included in the second application group on the two sub areas, respectively.

The display apparatus 100 may receive a gesture for selecting one of the applications displayed on the two sub areas. That is, the display apparatus 100 may select one of the plurality of applications on the basis of the input touch gesture. In FIG. 14(2), the talk application 45 is selected.

Referring to FIG. 14(3), the display apparatus 100 in which the selected application is displayed is shown. If one application is selected, the display apparatus 100 may display that the corresponding application has been selected. For example, the display apparatus 100 may display an edge of the selected application in a bold line. Or, the display apparatus 100 may allow the selected application to be shaded. Or, the display apparatus 100 may display the selected application in a specific color.

If one application of the second application group is selected and the display apparatus 100 is rotated in a lateral direction, the display apparatus 100 may display the selected application on the main area of the main display 111. Alternatively, the display apparatus 100 may display the selected application on the main display 111 as a full screen.

As one embodiment, if the display apparatus 100 of FIG. 14(3) is rotated in a lateral direction, the main display 111 may display the talk application 45 on the main area or the full screen. That is, after one of the plurality of applications is selected, the display apparatus 100 may be rotated in a lateral direction. The display apparatus 100 may display the selected application on the main area or full area of the main display.

Figure 15:
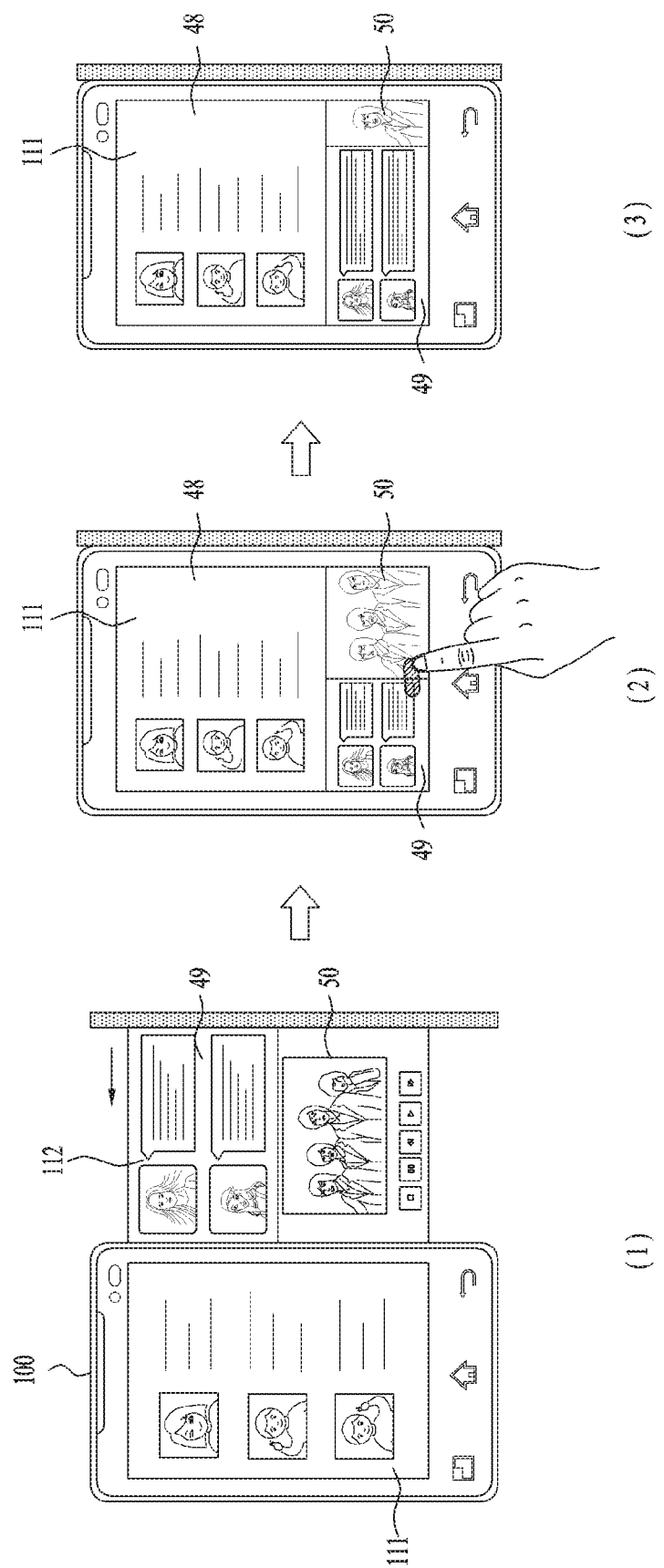
FIG. 15 is a diagram illustrating an operation for controlling a size of an area of a plurality of applications displayed on a sub display according to one embodiment.

FIG. 15 is a diagram illustrating an operation for controlling a size of an area of a plurality of applications displayed on a sub display according to one embodiment.

Referring to FIG. 15(1), the display apparatus 100 from which the sub display 112 is exposed is shown. The main display 111 may display a first application group, and the sub display 112 may display a second application group. The second application group may include a plurality of applications. For example, the first application group may be a moving image list, and the second application group may include a talk application 49 and a moving image application 50.

Referring to FIG. 15(2), the display apparatus 100 in which the sub display 112 is stored is shown. The display apparatus 100 may display the first application group and the second application group on the main display 111 at the same time for a previously set time. For example, the display apparatus 100 may divide the main display 111 into three areas. The three areas may include one main area and two sub areas. The display apparatus 100 may display the moving image list 48 included in the first application group on the main area and display the talk application 49 and the moving image application 50 included in the second application group on the two sub areas, respectively.

The display apparatus 100 may receive a gesture for controlling a size of the sub area on which the application is displayed. That is, the display apparatus 100 may control the size of the selected sub area on the basis of the input touch gesture. For example, the touch gesture for controlling the size of the sub area may be a drag gesture or a rub gesture. In FIG. 15(2), the sub area on which the talk application 49 is displayed has been enlarged.

Referring to FIG. 15(3), the display apparatus 100 in which the size of the sub area is controlled is shown. If the gesture for controlling the size of the sub area is input, the display apparatus 100 may display the corresponding application by controlling the size of the sub area. For example, the display apparatus 100 may enlarge the sub area on which the talk application 49 is displayed, on the basis of the gesture. If the size of the sub area is controlled, the display apparatus 100 may determine that the application displayed on the greatest sub area is selected.

If the display apparatus 100 is rotated in a lateral direction, the display apparatus 100 may display the application displayed on the enlarged sub area, on the main area of the main display 111. Alternatively, the display apparatus 100 may display the application displayed on the enlarged sub area, on the main display 111 as a full screen. If the display apparatus 100 is rotated in the lateral direction, the display apparatus 100 may display the application displayed on the broadest area of the plurality of sub areas, on the full screen or the main area of the main display 111.

That is, the display apparatus 100 may control the size of the area where the plurality of applications are displayed, on the basis of the input touch gesture. The display apparatus 100 may determine that the application displayed on the greatest sub area has been selected. Therefore, if the display apparatus is rotated in the lateral direction, the display apparatus 100 may display the selected application on the full area or main area of the main display.

Figure 16:
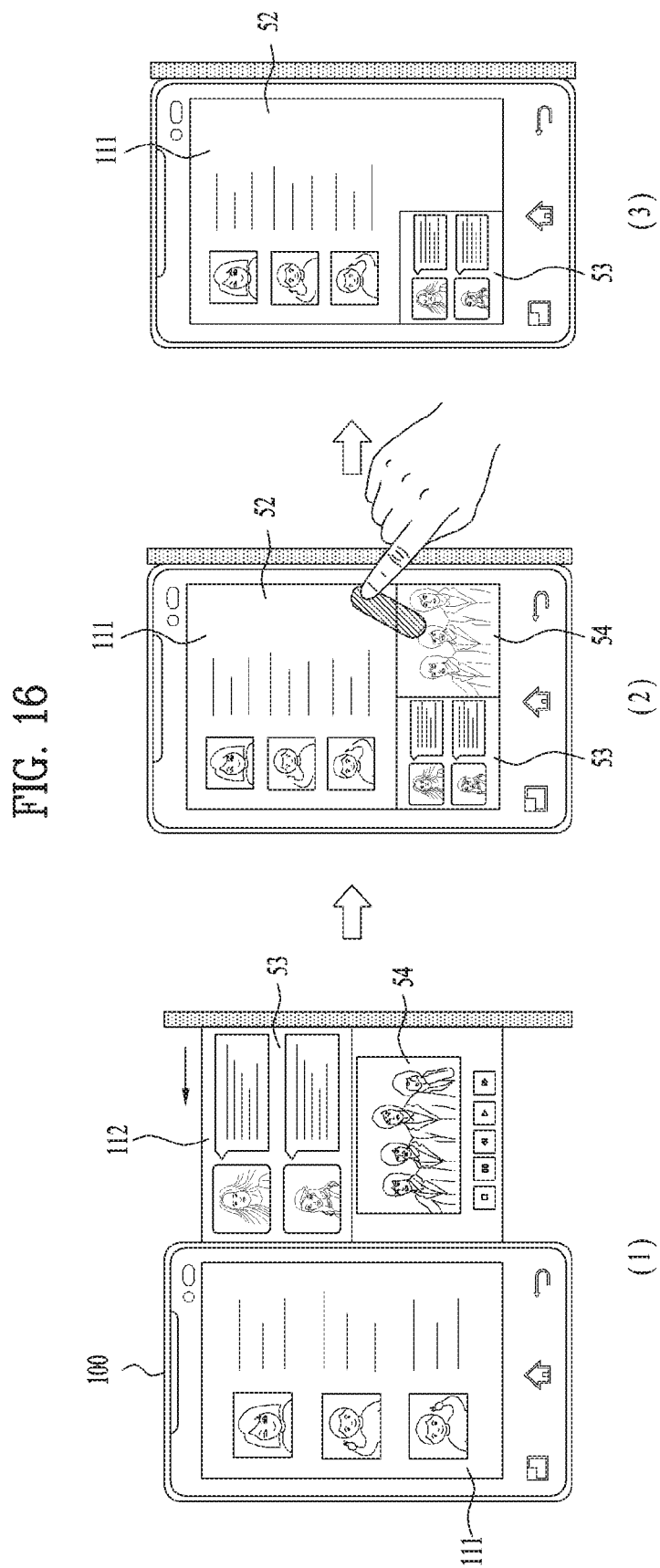
FIG. 16 is a diagram illustrating an operation for deleting one of a plurality of applications displayed on a sub display according to one embodiment.

FIG. 16 is a diagram illustrating an operation for deleting one of a plurality of applications displayed on a sub display according to one embodiment.

Referring to FIG. 16(1), the display apparatus 100 from which the sub display 112 is exposed is shown. The main display 111 may display a first application group, and the sub display 112 may display a second application group. The second application group may include a plurality of applications. For example, the first application group may be a moving image list, and the second application group may include a talk application 53 and a moving image application 54.

Referring to FIG. 16(2), the display apparatus 100 in which the sub display 112 is stored is shown. The display apparatus 100 may display the first application group and the second application group on the main display 111 at the same time for a previously set time. For example, the display apparatus 100 may divide the main display 111 into three areas. The three areas may include one main area and two sub areas. The display apparatus 100 may display the moving image list 52 included in the first application group on the main area and display the talk application 53 and the moving image application 54 included in the second application group on the two sub areas, respectively.

The display apparatus may receive a gesture for deleting one of the applications displayed on the two sub areas. That is, the display apparatus 100 may delete one of the plurality of applications on the basis of the input touch gesture. For example, the gesture for deleting the corresponding application may be an operation for touching the sub area on which one application is displayed and dragging the touched area to the main area. In FIG. 16(2), the moving image application 54 has been deleted.

Referring to FIG. 16(3), the display apparatus 100 in which the selected application is displayed is shown. If one application is deleted, the display apparatus 100 may remove the deleted application from the screen.

If one application of the second application group is deleted and the display apparatus 100 is rotated in a lateral direction, the display apparatus 100 may display the application, which is not deleted, on the main area of the main display 111. Alternatively, the display apparatus 100 may display the application, which is not deleted, on the main display 111 as a full screen. That is, the display apparatus 100 may delete the selected one of the plurality of applications in accordance with the input touch gesture.

Up to now, the various embodiments of the display apparatus have been described. The display apparatus 100 may include a grip unit to expose or store the sub display 112/

Figure 17:
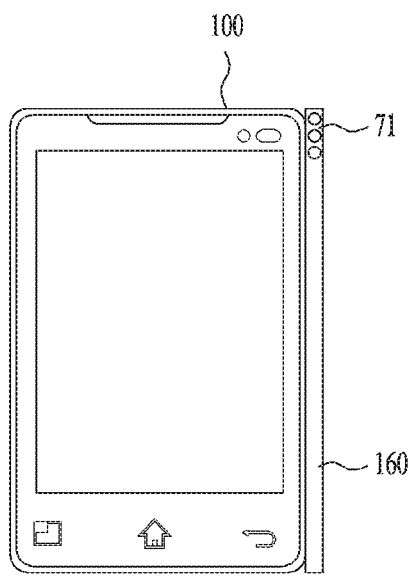
FIG. 17 is a diagram illustrating a grip that includes an LED according to one embodiment.

FIG. 17 is a diagram illustrating a grip that includes an LED according to one embodiment.

The display apparatus 100 may include a grip unit 160. The grip unit 160 is a mechanical component but may include an electric component that may display an indicator. That is, the grip unit 160 is connected with the sub display and may display the indicator. To display the indicator, the grip unit 160 may include at least one of LED, LCD and OLED.

Referring to FIG. 17, the display apparatus 100 may include a grip unit 160 that includes at least one LED 71. As one embodiment, the at least one LED 71 may display an indicator such as text message reception, incoming call, low battery, and battery charging. Alternatively, the at least one LED 71 may display a state of the main display or the sub display. As one embodiment, if the sub display is stored, the at least one LED 71 may display the state of the main display, and if the sub display is exposed, the at least one LED 71 may display the state of the sub display. For example, the state of the display unit, which may be displayed, may include the state as to whether the display unit drives the corresponding application and the state as to whether data related to the application have been downloaded.

Figure 18:
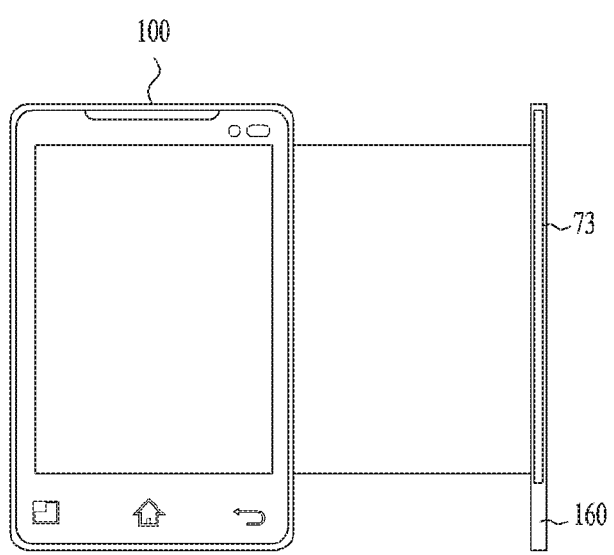
FIG. 18 is a diagram illustrating a grip that includes a display according to one embodiment.

FIG. 18 is a diagram illustrating a grip that includes a display according to one embodiment.

Referring to FIG. 18, the display apparatus 100 that comprises a grip unit 160 that includes an auxiliary display unit 73 is shown. For example, the auxiliary display unit 73 may include at least one of LCD and OLED.

Similarly to FIG. 17, the auxiliary display unit 73 of the grip unit 160 may display an indicator such as text message reception, incoming call, low battery, and battery charging. Alternatively, the auxiliary display unit 73 may display a state of the main display or the sub display. As one embodiment, if the sub display is stored, the auxiliary display unit 73 may display the state of the main display, and if the sub display is exposed, the auxiliary display unit 73 may display the state of the sub display. For example, the state of the display unit, which may be displayed, may include the state as to whether the display unit drives the corresponding application, the state as to whether data related to the application have been downloaded, the state as to title of the driven application, the state as to additional information. In detail, in case of a text message or talk application, the auxiliary display unit 73 may display a text message or talk, which is recently received. In case of a music or moving image application, the auxiliary display unit 73 may display additional information such as current play timing, full running time, application play state, title, and writer.

The sub display may be stored or exposed. Hereinafter, a structure of the sub display will be described.

FIG. 19 is an exemplary diagram illustrating a method for storing a sub display.

Referring to FIG. 19(1), the sub display 112 which is exposed is shown. The sub display 112 may be stored in the display apparatus 100. As one embodiment, the sub display 112 may be implemented as a flexible display module. The display apparatus 100 may include a roller 81 in an opposite direction of an entrance direction of the sub display 112. A part of the sub display 112 may be rolled in the roller 81. The roller 81 may have a certain restoring force. For example, the roller 81 is connected with an element having an elastic force such as spring and rubber and thus may have a restoring force rotated in an original direction if an external force disappears. The sub display 112 may be exposed externally due to a pulling force of a user. The roller 81 may be rotated in an opposite direction of a rolling direction of the sub display 112 due to a pulling force of a user, and the sub display 112 may be unrolled.

Referring to FIG. 19(2), the sub display 112 which is stored is shown. The user may arrange the sub display 112. The pulling force that acts on the sub display 112 disappears. The sub display 112 is connected to the roller 81, and the roller 81 may have a restoring force. Therefore, the sub display 112 may be rolled automatically in accordance with the restoring force of the roller 81. That is, the sub display 112 may be implemented in the form of a rollable display, and may be stored in the display apparatus 100 if the external force disappears in a state that the sub display is exposed.

FIG. 20 is another exemplary diagram illustrating a method for storing a sub display.

Figure 21:
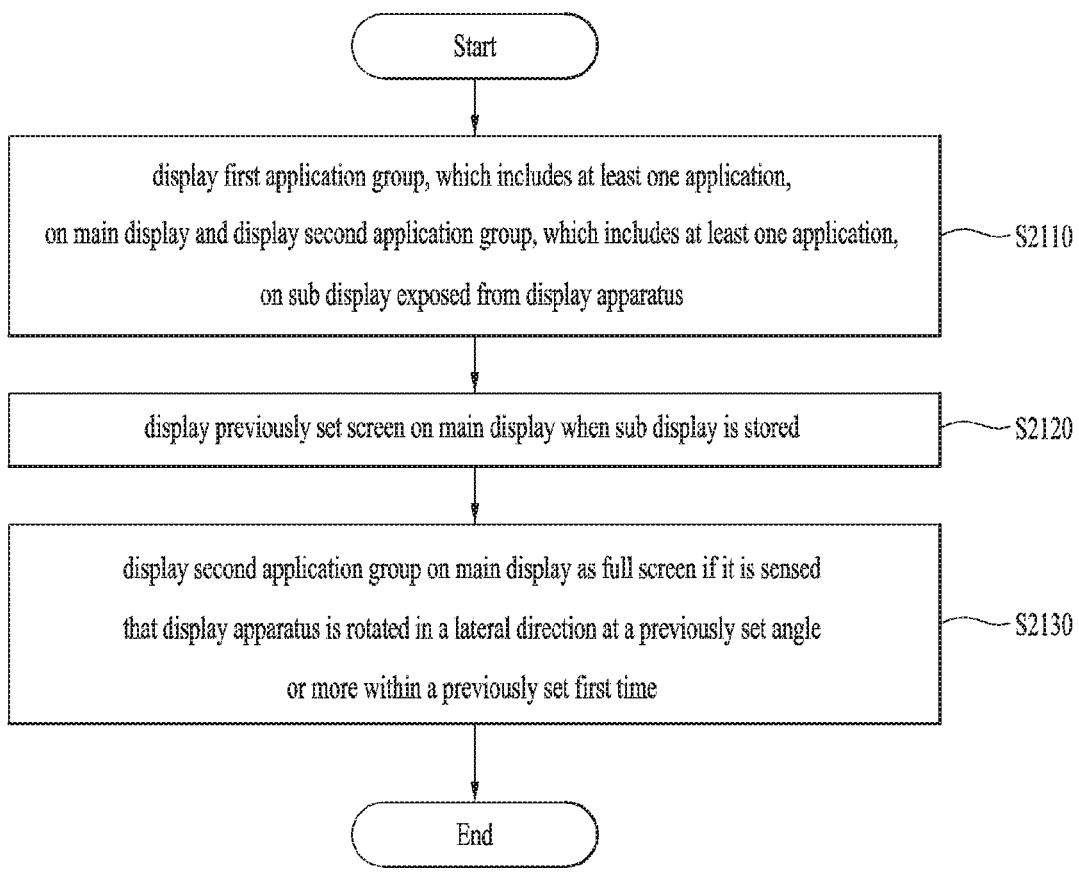
FIG. 21 is a flow chart illustrating a control method of a display apparatus according to one embodiment.

Referring to FIG. 21(1), the sub display 112 which is exposed is shown. As one embodiment, the sub display 112 may be implemented as a flexible display module, a transparent display module, a general display module, etc. The display apparatus 100 may include a slide unit. The slide unit may include a slide lane 82 and a slider 83. Alternatively, the slide unit may be implemented as an inner slider and an outer slider, which constitute a pair. As one embodiment, the display apparatus 100 may arrange the slide lane 82 at an inner side, and may arrange the slider 83 moving along the slide lane 82. The slider 83 may be connected with the sub display 112. The sub display 112 may be exposed externally by an external pulling force. The slider 83 connected with the sub display 112 may move along the slide lane 82.

Referring to FIG. 20(2), the sub display 112 which is stored is shown. The slider 83 may be connected with additional element. If there is no other element in the slider 83, the sub display 112 may be stored manually by a pushing force. As one embodiment, the slider 83 is connected with an element having an elastic force such as spring and rubber and thus may have a restoring force rotated in an original direction if an external force disappears. The user may arrange the sub display 112. The pulling force that acts on the sub display 112 disappears. The sub display 112 is connected to the slider 83, and the slider 83 may have a restoring force. Therefore, the sub display 112 may be rolled automatically in accordance with the restoring force of the slider 83. That is, the sub display 112 may be implemented in the form of a slide display, and may be stored automatically in the display apparatus 100 if the external force disappears in a state that the sub display is exposed.

FIG. 21 is a flow chart illustrating a control method of a display apparatus according to one embodiment.

Referring to FIG. 21, the display apparatus may display a first application group, which includes at least one application, on the main display, and may display a second application group, which includes at least one application, on the sub display exposed therefrom (S2110). The first application group and the second application group may include one application or a plurality of applications. For example, the application may include a general application, contents, software, program, list, icon, home screen, etc.

The display apparatus may display a previously set screen on the main display if the sub display is stored therein (S2120). For example, the previously set screen may include a screen for displaying the first application group only and a screen for displaying the first application group and the second application group at the same time.

The display apparatus may display the second application group on the main display as a full screen if it is sensed that the display apparatus is rotated in a lateral direction at a previously set angle or more within a previously set time (S2130).

The display apparatus may display the first application group on the main display if it is sensed by the sensor unit that the display apparatus is rotated in an opposite direction of the lateral direction at a previously set angle or more within a previously set time after being rotated in the lateral direction. For example, the previously set time may be calculated from the time when the sub display is stored, or may be calculated from the time when the display apparatus is rotated in the lateral direction.

The display apparatus and the method for controlling the same disclosed in this specification are not limited to the aforementioned embodiments, and all or some of the aforementioned embodiments may selectively be configured in combination so that various modifications may be made in the aforementioned embodiments.

Meanwhile, the method for controlling the display apparatus disclosed in this specification may be implemented in a recording medium, which may be read by a processor provided in the display apparatus, as software. The recording medium that can be read by the processor includes all kinds of recording media in which data that can be read by the processor are stored. Examples of the recording medium include a ROM, a RAM, a CD-ROM, a magnetic tape, a floppy disk, and an optical data memory. Also, another example of the recording medium may be implemented in a shape of carrier wave such as transmission through Internet. Also, the recording medium that can be read by the processor may be distributed in a computer system connected thereto through a network, whereby codes that can be read by the processor may be stored and implemented in a distributive mode.

It will be apparent to those skilled in the art that the present specification can be embodied in other specific forms without departing from the spirit and essential characteristics of the specification. Thus, the above embodiments are to be considered in all respects as illustrative and not restrictive. The scope of the specification should be determined by reasonable interpretation of the appended claims and all change which comes within the equivalent scope of the specification are included in the scope of the specification.

MODE FOR CARRYING OUT THE INVENTION

The details have been described above in the best mode for carrying out the present invention.

INDUSTRIAL APPLICABILITY

The present invention may be used for the display apparatus and has industrial applicability with repeatability.

The invention claimed is:

1. A display apparatus comprising:
a main display;
a sub display configured to be stored in the display apparatus or exposed therefrom;
a sensor; and
a controller operably coupled with the main display, sub display, and sensor, and configured to:
control the main display, the sub display and the sensor;
cause the main display to display a first application group that includes a first application on a full area of the main display;
cause the sub display exposed from the display apparatus to display a second application group that includes a second application while the first application group is displayed on the main display;
cause the main display to display the second application group on a first partial area of the main display displaying the first application group on the full area when the sub display, which displayed the second application group, is stored in the display apparatus;
cause the main display to display the second application group on the full area in response to sensing, by the sensor, that the display apparatus, in which the sub display is stored, has been rotated by at least a first angle within a previously set first time, the first display group being displayed on a second partial area of the main display displaying the second application group on the full area;
cause the sub display to display the first application group when the sub display of the rotated display apparatus is exposed within a previously set second time; and
cause the main display to display a first portion of an enlarged second application group and cause the sub display to display a second portion of the enlarged second application group when the sub display of the rotated display apparatus is exposed after the previously set second time.

2. The display apparatus according to claim 1, wherein the second application group includes a moving image application.

3. The display apparatus according to claim 2, wherein the controller is further configured to cause the main display to display a user interface for controlling the moving image application while the second application group is displayed on the full area of the main display.

4. The display apparatus according to claim 3, wherein the controller is further configured to cause the sub display to display the user interface when the main display displays the first portion of the enlarged second application group and when the sub display displays the second portion of the enlarged second application group.

5. The display apparatus according to claim 1, wherein, in response to sensing by the sensor that the rotated display apparatus is rotated in an opposite direction of the rotation at a previously set angle or more within the previously set first time, the controller is further configured to cause the main display to display the first application group.

6. The display apparatus according to claim 1, wherein, in response to sensing by the sensor that the rotated display apparatus is rotated in an opposite direction of the rotation at a previously set angle or more within a previously set third time, the controller is further configured to cause the main display to display the first application group.

7. The display apparatus according to claim 1, further comprising a grip unit connected with the sub display, displaying an indicator.

8. The display apparatus according to claim 7, wherein the grip unit includes at least one of LED, LCD, or OLED.

9. The display apparatus according to claim 1, wherein the controller is further configured to cause the main display to stop displaying the first application group on the partial area of the main display such that only the second application group is displayed on the full area of the main display after the previously set second time passes without exposing the sub display of the rotated display apparatus.

10. The display apparatus according to claim 1, wherein the first application is different from the second application.

11. The display apparatus according to claim 1, wherein the second application group displayed on the partial area of the main display overlaps the first application group displayed on the full area of the main display.

12. The display apparatus according to claim 1, wherein the first application group displayed on the partial area of the main display overlaps the second application group displayed on the full area of the main display.

13. The display apparatus according to claim 1, wherein an orientation of the second application group displayed on the full area of the main display after the storing of the sub display in the display apparatus and after the rotating the display apparatus is different from an orientation of the second application group displayed on the sub display prior to the storing of the sub display in the display apparatus.

14. The display apparatus according to claim 1, wherein an orientation of the display apparatus is changed from a portrait orientation to a landscape orientation or from the landscape orientation to the portrait orientation when the display apparatus is rotated by at least the first angle.

15. A method for controlling a display apparatus comprising a main display and a sub display configured to be stored in the display apparatus or exposed therefrom, the method comprising:
displaying a first application group that includes a first application on a full area of the main display;
displaying a second application group that includes a second application on the sub display exposed from the display apparatus while the first application group is displayed on the main display;
displaying the second application group on a first partial area of the main display displaying the first application group on the full area when the sub display, which displayed the second application group, is stored in the display apparatus;
displaying the second application group on the full area of the main display when the display apparatus, in which the sub display is stored, is rotated by at least a first angle within a previously set first time, the first display group being displayed on a second partial area of the main display displaying the second application group on the full area;
displaying the first application group on the sub display when the sub display of the rotated display apparatus is exposed within a previously set second time; and displaying a first portion of an enlarged second application group on the main display and displaying a second portion of the enlarged second application group on the sub display when the sub display of the rotated display apparatus is exposed after the previously set second time.

16. The method according to claim 15, further comprising displaying the first application group on the main display when the rotated display apparatus is rotated in an opposite direction of the rotation at a previously set angle or more within the previously set first time.

* * * * *